(12) United States Patent
Kim et al.

(10) Patent No.: US 11,250,287 B2
(45) Date of Patent: Feb. 15, 2022

(54) ELECTRONIC DEVICE AND CHARACTER RECOGNITION METHOD THEREOF

(71) Applicant: SAMSUNG ELECTRONICS CO., LTD., Suwon-si (KR)

(72) Inventors: Jinhyun Kim, Daegu (KR); Misu Kim, Gumi-si (KR); Jeong-In Choe, Sejong (KR); Ju-Yong Choi, Gumi-si (KR); Hyun-Suk Choi, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 16/640,934

(22) PCT Filed: Jul. 31, 2018

(86) PCT No.: PCT/KR2018/008655
§ 371 (c)(1),
(2) Date: Feb. 21, 2020

(87) PCT Pub. No.: WO2019/039760
PCT Pub. Date: Feb. 28, 2019

(65) Prior Publication Data
US 2020/0210742 A1    Jul. 2, 2020

(30) Foreign Application Priority Data
Aug. 22, 2017  (KR) ........................ 10-2017-0106177

(51) Int. Cl.
*G06K 9/32*    (2006.01)
*G06K 9/00*    (2022.01)
*G06K 9/62*    (2022.01)

(52) U.S. Cl.
CPC ....... *G06K 9/3233* (2013.01); *G06K 9/00456* (2013.01); *G06K 9/6264* (2013.01); *G06K 2209/01* (2013.01)

(58) Field of Classification Search
CPC ............. G06K 9/00456; G06K 9/3233; G06K 9/6264; G06K 2209/01
(Continued)

(56) References Cited

U.S. PATENT DOCUMENTS 8,903,136 B1    12/2014  Wang et al.
9,047,531 B2 *   6/2015  Showering ............. G06K 9/228
(Continued)

FOREIGN PATENT DOCUMENTS

EP    2 388 735      11/2011
JP    2001-188881     7/2001
(Continued)

OTHER PUBLICATIONS

Partial Supplementary European Search Report dated Jul. 20, 2020 in counterpart EP Application No. 18849299.5.
(Continued)

*Primary Examiner* — Daniel G Mariam
(74) *Attorney, Agent, or Firm* — Nixon & Vanderhye, P.C.

(57) ABSTRACT

Various embodiments of the present disclosure relate to an electronic device and a character recognition method thereof. The electronic device may include a housing, a touchscreen display exposed through a first portion of the housing, an image sensor exposed through a second portion of the housing, a wireless communication circuit located in the housing, a processor operatively coupled to the touchscreen display, the image sensor, and the wireless communication circuit, and a memory operatively coupled to the processor. The memory may store instructions, which when executed, cause the processor to control the electronic device to display a user interface including an image acquired from the image sensor or stored in the memory, and recognize a region including a text in the image for optical (Continued)

character recognition by detecting a boundary of the region, comparing a size of the region with a predetermined size, and selecting the region for the optical character recognition based at least in part on the comparison result. Other various embodiments are also possible.

17 Claims, 18 Drawing Sheets

(58) Field of Classification Search
USPC .................................................. 382/195, 218
See application file for complete search history.

(56) References Cited

U.S. PATENT DOCUMENTS

| 10,373,329 B2* | 8/2019 | Okubo | G06K 9/6232 |
|---|---|---|---|
| 2008/0100884 A1 | 5/2008 | Seo | |
| 2012/0302255 A1* | 11/2012 | Wang | H04B 1/3833 |
| | | | 455/456.1 |
| 2013/0004076 A1 | 1/2013 | Koo et al. | |
| 2013/0182002 A1 | 7/2013 | Macciola et al. | |
| 2014/0056475 A1 | 2/2014 | Jang et al. | |
| 2014/0192210 A1 | 7/2014 | Gervautz et al. | |
| 2014/0368891 A1 | 12/2014 | Beato et al. | |
| 2015/0244900 A1 | 8/2015 | Kichikawa | |

FOREIGN PATENT DOCUMENTS

| JP | 2012-103749 | 5/2012 |
|---|---|---|
| JP | 2015-210543 | 11/2015 |
| JP | 5847964 | 1/2016 |
| KR | 10-2012-0090879 | 8/2012 |
| KR | 10-2014-0010164 | 1/2014 |
| KR | 10-2014-0030361 | 3/2014 |
| KR | 10-2015-0104126 | 9/2015 |

OTHER PUBLICATIONS

Extended Search Report dated Nov. 11, 2020 in counterpart European Patent Application No. EP18849299.5.
International Search Report for PCT/KR2018/008655, dated Oct. 31, 2018, 4 pages.
Written Opinion of the ISA for PCT/KR2018/008655, dated Oct. 31, 2018, 5 pages.

* cited by examiner

ELECTRONIC DEVICE AND CHARACTER RECOGNITION METHOD THEREOF

This application is the U.S. national phase of International Application No. PCT/KR2018/008655 filed Jul. 31, 2018 which designated the U.S. and claims priority to KR Patent Application No. 10-2017-0106177 filed Aug. 22, 2017, the entire contents of each of which are hereby incorporated by reference.

TECHNICAL FIELD

Various embodiments of the present disclosure relate to an electronic device and a character recognition method thereof.

BACKGROUND ART

Electronic devices (e.g., a mobile terminal, a smart phone, a wearable electronic device, etc.) may provide various functions. For example, the smart phone may provide short-distance wireless communication (Bluetooth, Wireless Fidelity (WiFi), Near Field Communication (NFC), etc.), mobile communication ($3^{rd}$ Generation (3G), $4^{th}$ Generation (4G), $5^{th}$ Generation (5G), etc.), a music or video playback function, an image capturing function, a navigation function, a messenger function, or the like.

Meanwhile, the electronic devices may provide a character recognition function. For example, recently, the electronic devices may recognize a character included in an image, a photo, or the like.

In general, the electronic device may detect a region (a character recognition region) for recognizing a character from an image, and may recognize the character from the detected character recognition region. The electronic device may detect the character recognition region based on a most dominant edge to be detected. However, when the character recognition region is detected based on the most dominant edge, the character recognition region may not be properly detected. For example, in case of capturing a document, an object (e.g., a picture inserted on the document) located inside the document may be erroneously detected as the character recognition region, and thus character recognition may not be performed.

To solve the aforementioned problems, various embodiments of the present disclosure may provide an electronic device capable of recognizing a character based on validity of a region (e.g., a character recognition region) extracted for character recognition from an image, and a character recognition method thereof.

Various embodiments of the present disclosure may provide an electronic device capable of identifying validity of a character recognition region by using a virtual reference object, and a character recognition method thereof.

Various embodiments of the present disclosure may provide an electronic device capable of varying a shape, size, and/or position of a virtual reference object, and a character recognition method thereof.

Various embodiments of the present disclosure may provide an electronic device for providing a feedback for validity of a character recognition region, and a character recognition method thereof.

According to various embodiments of the present disclosure, an electronic device may include a housing, a touchscreen display exposed through a first portion of the housing, an image sensor exposed through a second portion of the housing, a wireless communication circuit located in the housing, a processor operatively coupled to the touchscreen display, the image sensor, and the wireless communication circuit, and a memory operatively coupled to the processor. The memory may store instructions, which when executed, to cause the processor to control the electronic device to display a user interface including an image acquired from the image sensor or stored in the memory, and recognize a region including a text in the image for optical character recognition by detecting a boundary of the region, comparing a size of the region with a predetermined size, and selecting the region for the optical character recognition based at least in part on the comparison result.

According to various embodiments of the present disclosure, an electronic device may include a display, a memory storing at least one instruction, and at least one processor operatively coupled to the display and the memory. The at least one processor may be configured to control the electronic device to, based at least in part on the execution of the instruction, extract a character recognition region from an image displayed on the display, identify whether the extracted character recognition region is valid, and recognize a character from the character recognition region if the character recognition region is valid.

Various embodiments of the present disclosure can prevent erroneous detection of a character recognition region by identifying validity of the character recognition region, and can prevent a recognition rate from being decreased due to the erroneous detection. Various embodiments of the present disclosure can improve accuracy of detection of the character recognition region by properly adjusting a position and/or size of a virtual reference object for identifying validity. Various embodiments of the present disclosure can provide a guide for validity of the character recognition region.

Various embodiments of the present disclosure can improve user's reliability and user's convenience for character recognition.

DETAILED DESCRIPTION OF EXAMPLE EMBODIMENTS

Figure 1:
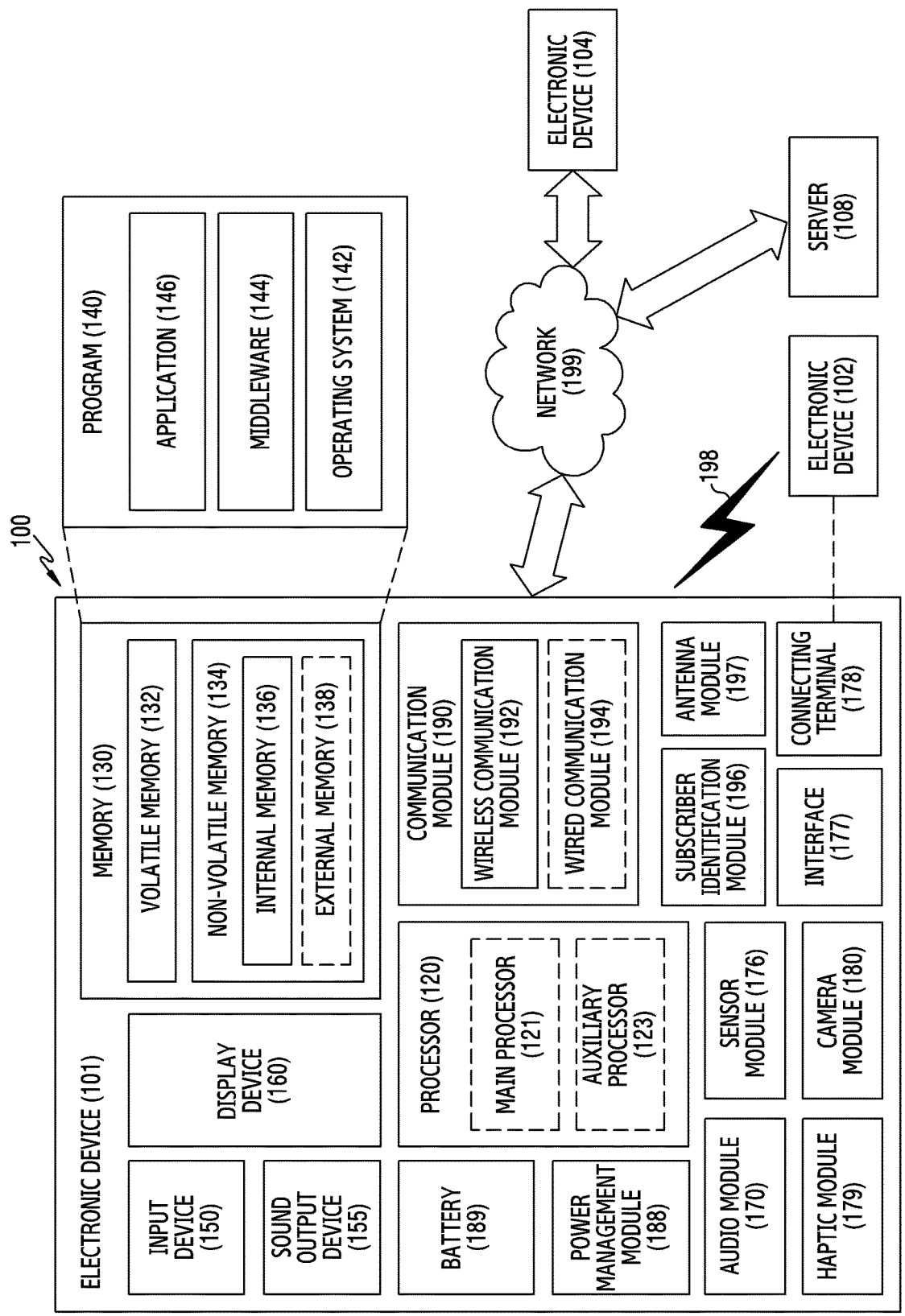
FIG. 1 is a block diagram of an electronic device in a network environment according to various embodiments.

Hereinafter, various embodiments of the present disclosure are described with reference to the accompanying drawings. Specific embodiments have been shown by way of example in the drawings and will be described in detail in the present document. It should be understood, however, that it is not intended to limit the various embodiments of the present disclosure to a particular form. For example, it is apparent to those ordinarily skilled in the art that the embodiments of the present disclosure can be modified in various manners.

Before detailed descriptions, hereinafter, various embodiments of the present disclosure will be described based on an example of recognizing a character from an image. However, the embodiments of the present disclosure are also applicable to object recognition or vision-based recognition or the like for recognizing an object from an image, instead of character recognition.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication), or an electronic device 104 or a server 108 via a second network 199 (e.g., a long-range wireless communication). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiments, some of the components, for example, may be integrated and implemented such as the sensor module 176 (e.g., a fingerprint sensor, an iris sensor, or an illuminance sensor) embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load and process a command or data received from another component (e.g., the sensor module 176 or the communication module 190) in volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121, may additionally or alternatively consume less power than the main processor 121, or to be specific to a specified function. The auxiliary processor 123 may be implemented as separate from, or embedded in the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to a user of the electronic device 101. The display device 160 may include, for example, a display, a hologram device, or a projector and control circuitry to control a corresponding one of the display, hologram device, and projector. According to an embodiment, the display device 160 may include touch circuitry, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a specified protocol for coupling with the external electronic device (e.g., the electronic device 102) wiredly or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lense, image sensor, image signal processor, or flash.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single chip, or may be implemented as multi chips separate from each other.

The wireless communication module 192 may identify and authenticate the electronic device 101 in a communication network using subscriber information stored in the subscriber identification module 196.

The antenna module 197 may include one or more antennas to transmit or receive a signal or power to or from the outside. According to an embodiment, the communication module 190 (e.g., the wireless communication module 192) may transmit or receive the signal to or from the external electronic device through an antenna appropriate for a communication scheme.

Some of the above-described components may be coupled mutually and communicate signals (e.g., commands or data) therebetween via an inter-peripheral communication scheme (e.g., a bus, general purpose input/output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or by a request, the electronic device 101, instead of, or in addition to, executing the function or the service, may request at least part associated with the function or the service to external electronic devices. The external electronic devices receiving the request may perform the function requested, or an additional function, and transfer an outcome of the performing to the electronic device 101. The electronic device 101 may provide the outcome, with or without further processing of the outcome. To that end, a cloud computing, distributed computing, or client-server computing technology may be used, for example.

Figure 2A:
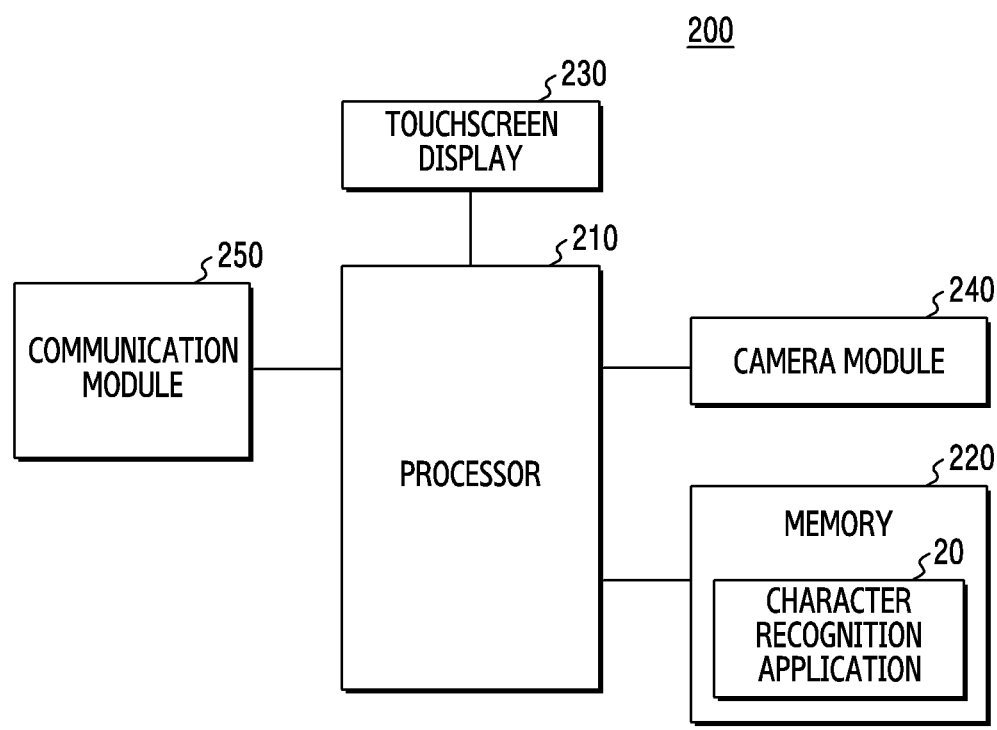
FIG. 2A is a block diagram illustrating a structure of an electronic device according to an embodiment of the present disclosure.
Figure 2B:
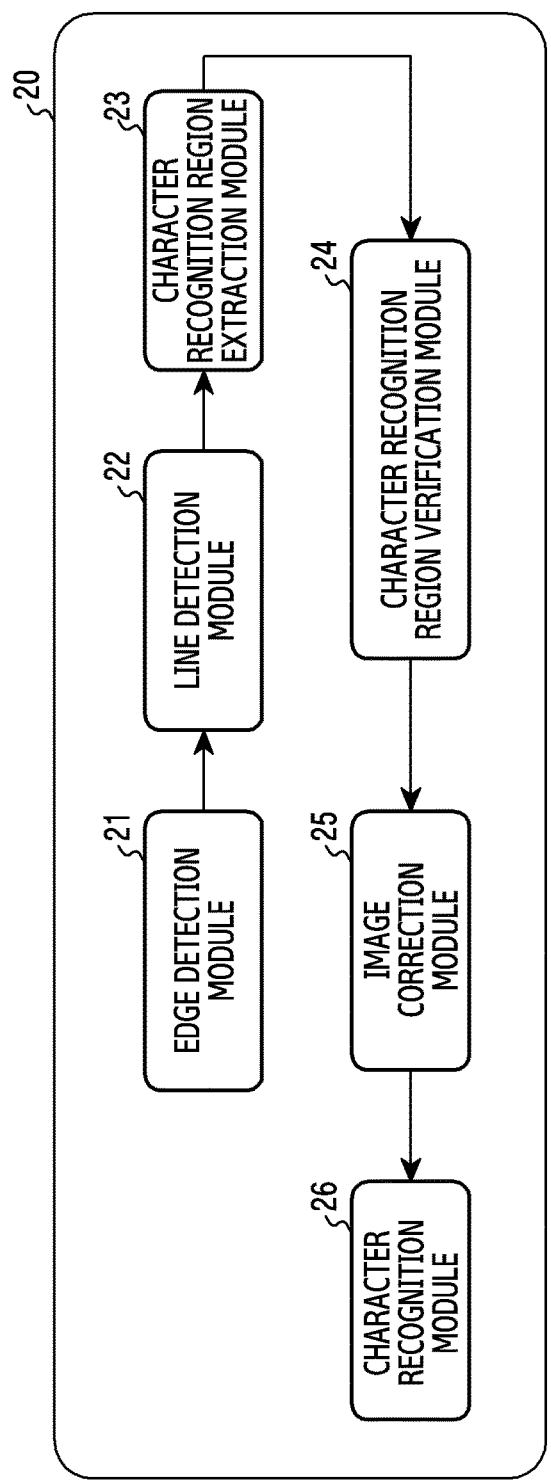
FIG. 2B illustrates a structure of a character recognition application of FIG. 2A.

FIG. 2A is a block diagram illustrating a structure of an electronic device according to an embodiment of the present disclosure, and FIG. 2B illustrates a structure of a character recognition application of FIG. 2A.

Before detailed descriptions, an electronic device 200 according to an embodiment of the present disclosure may have various shapes. For example, the electronic device 200 may be a portable electronic device such as a smart phone, a tablet Personal Computer (PC), a notebook, or the like, or a wearable electronic device (e.g., an electronic device with a form of a watch, a ring, a bracelet, an anklet, or a necklace) which can be worn on a part of a user's body.

Referring to FIG. 2A and FIG. 2B, the electronic device 200 according to an embodiment of the present disclosure may include, for example, all or some parts of the electronic device 101 of FIG. 1.

The electronic device 200 according to an embodiment of the present disclosure may include a processor 210, a memory 220, a touchscreen display 230, a camera module 240, and a communication module 250.

The processor 210 (e.g., the processor 120) may control an overall operation of the electronic device 200. For example, the processor 210 may control each of constitutional elements of the electronic device 200. The processor 210 may control each of the constitutional elements based on execution of commands or instructions stored in the memory 220, and may perform various functions.

The processor 210 may be a Central Processing Unit (CPU), an Application Processor (AP), a Micro Control Unit (MCU), a Micro Processor Unit (MCU), or the like. The processor 210 may be a single-core processor or a multi-core processor. In another embodiment, the processor 210 may be a multi-processor consisting of a plurality of processors. For example, the processor 210 may include an application processor and a Communication Processor (CP).

The processor 210 according to an embodiment of the present disclosure may perform (or process) character recognition. For example, the processor 210 may recognize a character from an image by using an Optical Character Recognition (OCR) technique.

The processor 210 according to an embodiment of the present disclosure may extract a character recognition region for recognizing a character from an image, identify whether the extracted character recognition region is valid, and process the character recognition based on a result thereof. Detailed descriptions thereof will be described below.

The memory 220 (e.g., the memory 130) according to an embodiment of the present disclosure may be located inside a housing of the electronic device 200, and may be electrically (or operatively) coupled to the processor 210. The memory 220 may store various programs, and may store data generated or downloaded during the various programs are executed. The memory 220 may store various commands and/or instructions for operating the processor 210. The memory 220 may include at least any one of an internal memory and an external memory.

The memory 220 according to an embodiment of the present disclosure may store a character recognition application 20 for character recognition from an image. For example, as shown in FIG. 2B, the character recognition application 20 may include an edge detection module 21, a line detection module 22, a character recognition region extraction module 23, a character recognition region verification module 24, an image correction module 25, and a character recognition module 26.

The edge detection module 21 according to an embodiment of the present disclosure may detect an edge from an image (e.g., a capture image, a preview image, a stored or downloaded image, etc.). The edge detection module 21 may detect the edge from the image by using various known edge detection techniques (or algorithms). For example, the edge detection module 21 may detect the edge by using a sobel edge detection scheme. The sobel edge detection scheme may detect only a dominant edge having a predetermined (designated) threshold by using a vertical and/or horizontal sobel filter to detect a vertical and/or horizontal edge in the image. According to some embodiments, the edge detection module 21 may use a canny edge detection scheme or a Laplacian edge detection scheme or the like.

The line detection module 22 according to an embodiment of the present disclosure may detect a line component from the image by using the detected edge. The line detection module 22 may use various known line detection techniques. For example, the line detection module 22 may use hough conversion to detect a line from dominant edges detected by the edge detection module 21. The hough conversion may detect at least one line by converting a detected edge coordinate into a size and an inclination domain (hough space) from a center.

The character recognition region extraction module 23 according to an embodiment of the present disclosure may extract (or select, recognize, detect) a region (hereinafter, a character recognition region) including a text from the image, by using the detected line. For example, the character recognition region extraction module 23 may extract a rectangular region consisting of an intersection point of lines detected through the hough conversion of the line detection module 22 as the character recognition region. The character recognition region extraction module 23 may extract a largest rectangular region as the character recognition region if a plurality of rectangular regions are constructed of lines. According to some embodiments, the character recognition region extraction module 23 may extract the character recognition region based on a line detected based on the most dominant (or clear) edge among detected edges.

The character recognition region verification module 24 according to an embodiment of the present disclosure may verify whether the extracted character recognition region is valid. For example, the character recognition region verification module 24 may compare a size of the character recognition region with a designated size, and may select the character recognition region based at least in part on a comparison result. For example, if the size of the character recognition region is greater than (or greater than or equal to) the designated size, the character recognition region verification module 24 may determine that the character recognition region is valid, and if the size of the character recognition region is less than (or less than or equal to) the designated size, may determine that the character recognition region is invalid.

According to some embodiments, the character recognition region verification module 24 may virtually generate a reference object for size comparison, and may compare a size of the generated virtual reference object with a size of the extracted character recognition region to verify whether the extracted character recognition region is valid. For example, if the extracted character recognition region is larger than or equal to (or larger than) the virtual reference object, the character recognition region verification module 24 may determine that the region is valid, and if the extracted character recognition region is smaller than (or smaller than or equal to) the virtual reference object, may determine that the region is invalid.

The virtual reference object according to an embodiment of the present disclosure may be generated in a specific form based on a predetermined rule, and may not be output on a screen. For example, the virtual reference object may have a size corresponding to a specific ratio (e.g., 2:1) of the image, and may have a rectangular shape. However, this is for exemplary purposes only, and thus embodiments of the present disclosure are not limited thereto. For example, a shape of the virtual reference object may be a shape of a polygon (e.g., a triangle, a pentagon, a hexagon, a trapezoid, etc.), a circle, or an ellipse. According to some embodiments, a size, shape, position, or the like of the virtual reference object may vary depending on a variety of information (e.g., distance information, an activated camera among a plurality of cameras, magnification information, etc.). Detailed descriptions thereof will be described below with reference to FIG. 9 to FIG. 12.

Although it is described above that the character recognition region verification module 24 according to an embodiment of the present disclosure verifies validity of the character recognition region through size comparison, this is for exemplary purposes only, and thus embodiments of the present disclosure are not limited thereto. For example, the character recognition region verification module 24 may verify validity of the extracted character recognition region in various manners. According to some embodiments, the character recognition region verification module 24 may compare a size and position of the virtual reference object with a size and position of the character recognition region to verify validity of the character recognition region.

According to some embodiments, the character recognition region verification module 24 may identify whether a ratio of the character recognition region for the entire image is greater than or equal to a designated value to verify validity of the character recognition region.

According to some embodiments, the character recognition region verification module 24 may compare capacity of the image with capacity of a portion detected as the character recognition region to verity validity of the character recognition region. For example, the character recognition region verification module 24 may determine that the image has capacity of 10 Mbytes, and, if the capacity of the portion detected as the character recognition region is greater than (or greater than or equal to) a designated ratio (e.g., 50%) (e.g., in case of having a size of 6 Mbytes), may determine that the character recognition region is valid.

In some embodiments, the character recognition region verification module 24 may compare a shape of a virtual reference object with a shape of the character recognition region to verify validity of the character recognition region. For example, when the virtual reference object is set to a circular shape, the character recognition region verification module 24 may determine that only the character recognition region having the circular shape is valid. The shape of the virtual reference object may vary depending on a recognition mode (e.g., a character recognition mode, an object recognition mode, etc.), or may vary depending on user's selection.

The image correction module 25 according to an embodiment of the present disclosure may crop the character recognition region from the image. According to some embodiments, the image correction module 25 may perform inclination correction and/or perspective correction of the cropped character recognition region.

The character recognition module 26 according to an embodiment may recognize a character from the image. For example, the character recognition module 26 may recognize the character from the character recognition region (or the character recognition region subjected to inclination and/or perspective correction) which is cropped from the image. According to some embodiments, the character recognition module 26 may be located in a server (e.g., the server 108).

Constructions (or structures) of the character recognition application of FIG. 2B are for exemplary purposes only, and thus embodiments of the present disclosure are not limited thereto. For example, each of the edge detection module 21, the line detection module 22, the character recognition region extraction module 23, the character recognition region verification module 24, the image correction module 25, and the character recognition module 26 may imply a set of one or more instructions. In addition, at least part of the edge detection module 21, the line detection module 22, character recognition region extraction module 23, the character recognition region verification module 24, the image correction module 25, and the character recognition module 26 may be included in a different construction of the electronic device, or may be included as a separate construction, or may be included in a server.

The touchscreen display 230 (e.g., the display device 160) according to an embodiment of the present disclosure may be exposed through a first surface (e.g., a front surface) of a housing of the electronic device 200, and may provide an output function. For example, the touchscreen display 230 may be a Liquid Crystal Display (LCD), a Light Emitting Diode (LED) display, an Organic Light Emitting Diode (OLED) display, a MicroElectroMechanical System (MEMS) display, or an electronic paper. According to some embodiments, the touchscreen display 230 may include a touch panel for receiving a user input, or may be integrated with a touch panel. The touch panel may include, for example, a first panel (not shown) for sensing a touch by using a finger, a second panel (not shown) for recognizing an input caused by an electronic pen, and/or a third panel (not shown) for sensing pressure. The touchscreen display 230 according to various embodiments of the present disclosure may display various user interfaces for character recognition.

The camera module 240 (e.g., the camera module 180) according to an embodiment of the present disclosure may be disposed inside the housing of the electronic device 200, and may be exposed through a second surface (e.g., a rear surface). The camera module 240 may capture a still image (e.g., a photo, a panoramic photo) or a moving image. The camera module 240 may generate a preview image to display, on a screen, an image incoming from a lens on a real-time basis. A size of the preview image may be determined according to a specification (e.g., resolution) of the touchscreen display 230. For example, when the touchscreen display 230 has a resolution of Full High Definition (FHD), the camera module 240 may generate a preview image with the resolution of FHD. The camera module 240 may generate a storage image to be stored in the memory 220 in response to a user input (e.g., a capturing command). The camera module 240 may generate the storage image with a supported maximum resolution (e.g., Ultra HD (UHD)), or may generate the storage image with a resolution which is set by a user.

In some embodiments, the camera module 240 may include at least two cameras. For example, the camera module 240 may include a first camera (not shown) and a second camera (not shown). The first camera and the second camera may have the same or different resolutions.

In some embodiments, the first camera may be a left camera for capturing a 3-Dimensional (3D) image, and the second camera may be a right camera for capturing the 3D image. According to another embodiment, the first camera may be an RGB camera for acquiring color information, and the second camera may be a mono camera for acquiring detail information. According to another embodiment, the first camera may be a standard camera, and the second camera may be a wide-view camera. According to another embodiment, the first camera may be a standard camera, and the second camera may be a telephoto camera. According to another embodiment, the first camera may be a wide-view camera, and the second camera may be a telephoto camera. According to another embodiment, the first camera may be a standard camera, and the second camera may be a depth camera for acquiring distance information.

The communication module 250 (e.g., the communication module 190) according to an embodiment of the present disclosure may be located inside the housing of the electronic device 200, and may perform wired communication and/or wireless communication. For example, the communication module 250 may include at least one wireless communication circuit (e.g., mobile communication, WiFi, LiFi, Bluetooth, etc.) and/or at least one wired communication circuit (e.g., High Definition Multiple Interface (HDMI), Display Port (DP), Universal Serial Bus (USB), etc.).

According to various embodiments of the present disclosure, the communication module 250 may transmit a character recognition region or an image (an original image) to at least one external device or server (e.g., the server 108) under the control of the processor 210, and may receive a character recognition result from the external electronic device or the server.

Meanwhile, although not shown in FIG. 2A, the electronic device 200 may not include some of the described constitutional elements, or may further include at least one different constitutional element (e.g., a digital broadcasting module, a fingerprint recognition sensor, an audio processing module, an input device, etc.) in the same level as the described constitutional elements.

An electronic device (e.g., the electronic device 101 of FIG. 1, the electronic device 200 of FIG. 2) according to various embodiments of the disclosure may include: a housing; a touchscreen display (e.g., the display device 160 of FIG. 1, the touchscreen display 230 of FIG. 2) exposed through a first portion of the housing; an image sensor (e.g., the camera module 180 of FIG. 1, the camera module 240 of FIG. 2) exposed through a second portion of the housing; a wireless communication circuit (e.g., the communication module 190 of FIG. 1, the communication module 250 of FIG. 2) located in the housing; a processor (e.g., the processor 120 of FIG. 1, the processor 210 of FIG. 2) operatively coupled to the touchscreen display, the image sensor, and the wireless communication circuit; and a memory (e.g., the memory 130 of FIG. 1, the memory 220 of FIG. 2) operatively coupled to the processor. The memory may store instructions, which when executed, cause the processor to control the electronic device to: display a user interface including an image acquired from the image sensor or stored in the memory; and recognize a region including a text in the image for optical character recognition by detecting a boundary of the region, comparing a size of the region with a predetermined size, and selecting the region for the optical character recognition based at least in part on the comparison result.

According to various embodiments, the instructions may cause the processor to control the electronic device to: determine whether the size of the region is greater than the predetermined size; select the region for the optical character recognition if the size of the region is greater than the predetermined size; and select the entire image for the optical character recognition if the size of the region is less than the predetermined size.

According to various embodiments, the instructions may cause the processor to control the electronic device to: display an animation effect on the touchscreen display while the region is recognized; and display a rectangle encompassing the region after displaying the animation effect.

According to various embodiments, the instructions may cause the processor to control the electronic device to perform the comparison by using a rectangular region having the designated size on the touchscreen display.

According to various embodiments, the rectangular region having the designated size may have a size of a designated ratio with respect to a width size and height size of the image.

According to various embodiments, the instructions may cause the processor to control the electronic device to provide a feedback regarding whether the recognized region is valid based at least in part on the comparison result.

According to various embodiments, the instructions may cause the processor to control the electronic device to change the designated size based on at least one of shooting distance information of the image, information of an activated camera among a plurality of cameras, or magnification information.

According to various embodiments, the instructions may cause the processor to control the electronic device to change the designated size to include at least one segmented region of which a visual importance is greater than or equal to a designated threshold or at least one of segmented regions based on a user input, based on a salient map for generating the segmented region according to the visual importance.

According to various embodiments, the instructions may cause the processor to control the electronic device to: identify whether correction is required for the selected region; and correct the selected region if the correction is required.

According to various embodiments, the image sensor may include a first image sensor and a second image sensor. The instructions may cause the processor to control the electronic device to: identify whether a region including a text can be recognized from a different image acquired using the second image sensor if the region is not recognized from the image acquired using the first image sensor; identify whether the different image is corrected if the region including the text can be recognized from the different image; and correct the image acquired using the first image based at least in part on correction information of the different image if correction is required for the different image.

An electronic device (e.g., the electronic device 101 of FIG. 1, the electronic device 200 of FIG. 2) according to various embodiments of the disclosure may include: a display (e.g., the display device 160 of FIG. 1, the touchscreen display 230 of FIG. 2); a memory (e.g., the memory 130 of FIG. 1, the memory 220 of FIG. 2) storing at least one instruction; and at least one processor (e.g., the processor 120 of FIG. 1, the processor 210 of FIG. 2) operatively coupled to the display and the memory. The at least one processor may be configured to control the electronic device to, based at least in part on the execution of the instruction: extract a character recognition region from an image displayed on the display; identify whether the extracted character recognition region is valid; and recognize a character from the character recognition region if the character recognition region is valid.

According to various embodiments, the at least one processor may be configured to control the electronic device to recognize a character from the displayed image if the character recognition is invalid.

According to various embodiments, the at least one processor may be configured to control the electronic device to: generate a virtual reference object based on a predetermined rule; compare the virtual reference object with the character recognition region; determine that the character recognition region is valid if the character recognition region is larger than the virtual reference object; and determine that the character recognition region is invalid if the character recognition region is smaller than the virtual reference object.

According to various embodiments, the at least one processor may be configured to control the electronic device to generate the virtual reference object so as to have a size of a designated ratio with respect to a size of the displayed image and to be located at a center of the displayed image.

According to various embodiments, the at least one processor may be configured to control the electronic device to generate a salient map for a dividable region of the display image according to visual importance and generate the virtual reference object to include at least one segmented region of which visual importance is greater than or equal to a designated threshold and at least one of regions based on a user input.

According to various embodiments, the at least one processor may be configured to control the electronic device to vary a size of the virtual reference object based on at least one of shooting distance information of the displayed image, information of an activated camera among a plurality of cameras, or magnification information.

According to various embodiments, the at least one processor may be configured to control the electronic device to identify whether the character recognition region requires correction, and if the correction is required, correct the character recognition region, and recognize a character from the corrected character recognition region.

According to various embodiments, the at least one processor may be configured to control the electronic device to provide a feedback regarding whether the character recognition region is valid if the displayed image is a preview image.

According to various embodiments, the at least one processor may be configured to control the electronic device to capture the character recognition region detected from the preview image, and recognize a character from the captured character recognition region.

According to various embodiments, the at least one processor may, when the displayed image is a first preview image acquired using a first camera, be configured to control the electronic device to: if the character recognition region is not detected from the first preview image, extract a character recognition region from a capture image of a second preview image acquired using at least one different camera; correct the character recognition region extracted from the capture image of the second preview image; correct the capture image of the first preview image based at least in part on correction information for the character recognition region extracted from the capture image of the second preview image; and recognize a character from the corrected capture image of the first preview image.

Figure 3A:
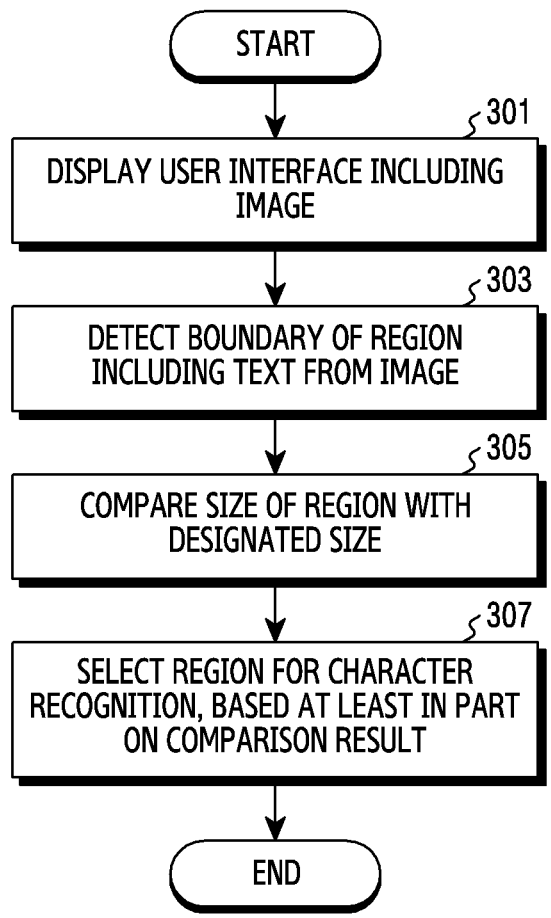
FIG. 3A illustrates a method of selecting a region for recognizing a character from an image of an electronic device according to an embodiment of the present disclosure.

FIG. 3A illustrates a method of selecting a region for recognizing a character from an image of an electronic device according to an embodiment of the present disclosure.

Referring to FIG. 3A, in operation 301, a processor (e.g., the processor 120 of FIG. 1, the processor 210 of FIG. 2) of an electronic device (e.g., the electronic device 101 of FIG. 1, the electronic device 200 of FIG. 2) according to an embodiment of the present disclosure may display a user interface including an image (hereinafter, an original image). The original image may be an image stored in a memory (e.g., the memory 220 of FIG. 2) in a capturing (shooting) or downloading manner or an image (e.g., a preview image) acquired via an image sensor (e.g., the camera module 180 of FIG. 1, the camera module 240 of FIG. 2).

In operation 303, the processor according to an embodiment of the present disclosure may extract a boundary of a region including a text from the image. For example, the processor may detect the region through edge detection and/or line detection from the original image. Herein, since the edge detection and the line detection are described above with reference to FIG. 2B, descriptions thereof will be omitted.

In some embodiments, during the region is recognized, the processor may display an animation effect on a display (e.g., the display device 160 of FIG. 1, the touchscreen display 230 of FIG. 2) and display a symbol (e.g., a rectangular box) covering the region after displaying the animation effect.

In operation 305, the processor according to an embodiment of the present disclosure may compare a size of the region with a designated size. For example, the processor may perform the comparison by using a region of a specific shape (e.g., a rectangular shape) having a designated size.

In operation 307, the processor according to an embodiment of the present disclosure may select a region for character recognition based on the comparison result. For example, the processor may identify whether the size of the region is greater than or equal to (or greater than) the designated size, and if the size of the region is greater than or equal to (or greater than) the designated size, may select the region for optical character recognition. Alternatively, if the size of the region is less than (or less than or equal to) the designated size, the entire image may be selected for optical character recognition.

Although not shown in FIG. 3A, the processor according to an embodiment of the present disclosure may recognize and output a character from the selected region.

Figure 3B:
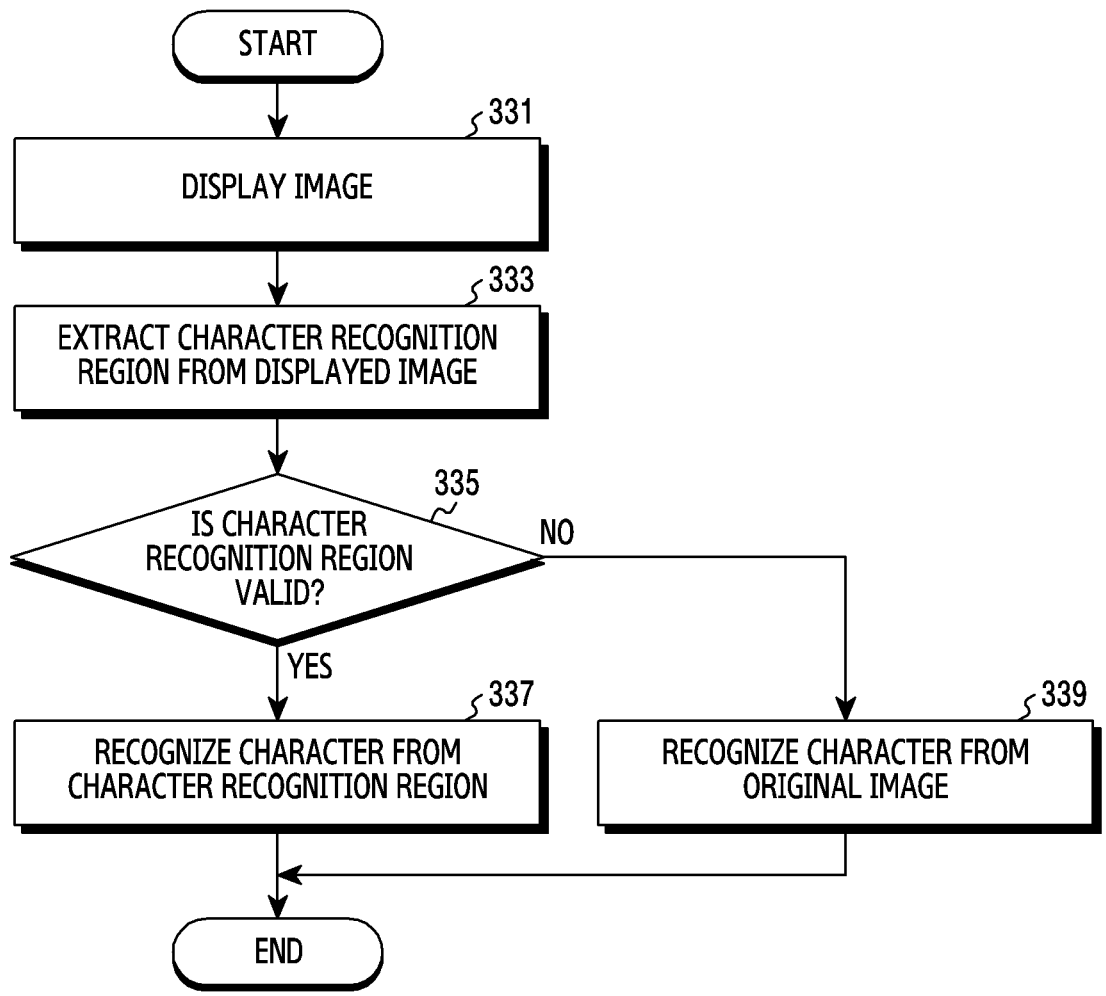
FIG. 3B illustrates a character recognition method of an electronic device according to an embodiment of the present disclosure.

FIG. 3B illustrates a character recognition method of an electronic device according to an embodiment of the present disclosure.

Referring to FIG. 3B, in operation 331, a processor (e.g., the processor 120 of FIG. 1, the processor 210 of FIG. 2) of an electronic device (e.g., the electronic device 101 of FIG. 1, the electronic device 200 of FIG. 2) according to an embodiment of the present disclosure may display an image (hereinafter, an original image). The original image may be an image stored in a memory (e.g., the memory 220 of FIG. 2) in a capturing (shooting) or downloading manner or a preview image.

In operation 333, the processor according to an embodiment of the present disclosure may extract a character recognition image from the displayed original image. For example, the processor may detect an edge and a line from the original image, and may extract the character recognition region based on a line which connects the most dominant edges. Since the edge detection and the line detection are described above with reference to FIG. 2B, detailed descriptions thereof will be omitted.

In operation 335, the processor according to an embodiment of the present disclosure may identify whether the character recognition region is valid. For example, the processor may compare the character recognition region with a designated size to identify whether the character recognition region is valid. According to some embodiments, the processor may generate a virtual reference object, and may identify whether the character recognition region is valid based on the virtual reference object. Detailed descriptions thereof will be described below with reference to FIG. 4.

If the character recognition region is valid in operation 335, proceeding to operation 337, the processor may recognize a character from the extracted character recognition region. Otherwise, if the character recognition region is invalid in operation 335, proceeding to step 339, the processor may recognize the character from the original image.

According to some embodiments, the processor may request for character recognition by transmitting the extracted character recognition region or original image to a designated server (e.g., the server 108 of FIG. 1) via a communication module (e.g., the communication module 190 of FIG. 1, the communication module 250 of FIG. 2), and may receive a result thereof.

According to some embodiments, the processor may identify whether the extracted character recognition region requires inclination correction and/or perspective correction, and if required, may perform the inclination correction and/or perspective connection of the character recognition region.

Figure 4:
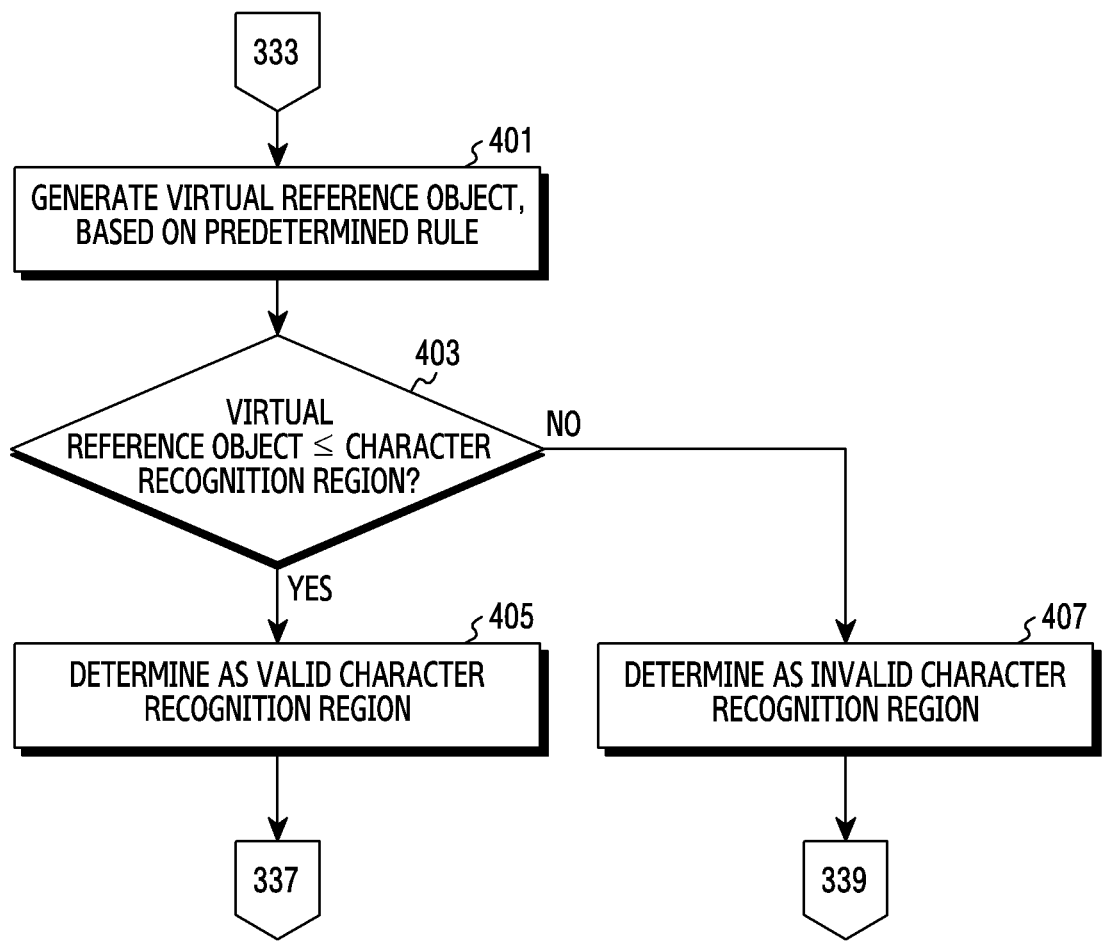
FIG. 4 illustrates a method of identifying validity of a character recognition region of an electronic device according to an embodiment of the present disclosure.

FIG. 4 illustrates a method of identifying validity of a character recognition region of an electronic device according to an embodiment of the present disclosure.

Referring to FIG. 4, in operation 401, a processor (e.g., the processor 120, the processor 210) of an electronic device (e.g., the electronic device 101, the electronic device 200) according to an embodiment of the present disclosure may generate a virtual reference object based on a predetermined rule. For example, the processor 210 may virtually generate an object (e.g., a polygon (a triangle, a rectangle, etc.), a circle, an ellipse, etc.) of a specific shape at a designated position (e.g., a center) to have a designated ratio (e.g., 2:1) with respect to a size of an original image.

A shape, size, and/or position of the virtual reference object may vary depending on various conditions. Detailed descriptions thereof will be described below.

In operation 403, the processor according to an embodiment of the present disclosure may identify whether the character recognition region is larger than or equal to the virtual reference object. According to some embodiments, the processor may identify whether the character recognition region is larger than the virtual reference object.

If the identification result of operation 403 shows that the character recognition region is larger than or equal to the virtual reference object, in operation 405, the processor may determine that the character recognition region is valid, and may return to operation 337 described above. Otherwise, if the identification result of FIG. 403 shows that the character recognition region is less than the virtual reference object, in operation 407, the processor may determine that the character recognition region is invalid, and may return to operation 339 described above.

Although character recognition has been described above, an embodiment of the present disclosure is not limited to the character recognition. According to some embodiments, the processor may detect an object (e.g., a wine bottle, a bag, a ball, etc.) from the image. The processor may generate a virtual reference object in a shape corresponding to the detected object. For example, the processor may detect a shape (a form) of at least one object included in the image through edge detection, display an object recognition region in a representative figure of the detected object, and generate the virtual reference object in a shape similar (or corresponding) to the representative figure. For example, upon detecting a circular object from the image, the processor may display the object recognition region in a circular shape, and may generate a circular virtual reference object.

Although it is described above that one character recognition region and a virtual reference object are compared, an embodiment of the present disclosure is not limited thereto. For example, the image may include a plurality of character recognition regions (or object recognition regions) and a plurality of virtual reference objects. At least one of the plurality of virtual reference objects may have the same or different shape and/or size. The processor may compare the plurality of character recognition regions (or object recognition regions) with the plurality of virtual reference objects to identify validity. For example, if the image includes a circular object (e.g., a ball) and a rectangular object (e.g., a notebook), the processor may generate a circular virtual reference object (hereinafter, a circular reference object) and a rectangular virtual reference object (hereinafter, a rectangular reference object), compare a first object recognition region including the circular object with the circular reference object, compare a second object recognition region including the rectangular object with the rectangular reference object, and identify whether the first object recognition region and the second object recognition region are valid.

Figure 5:
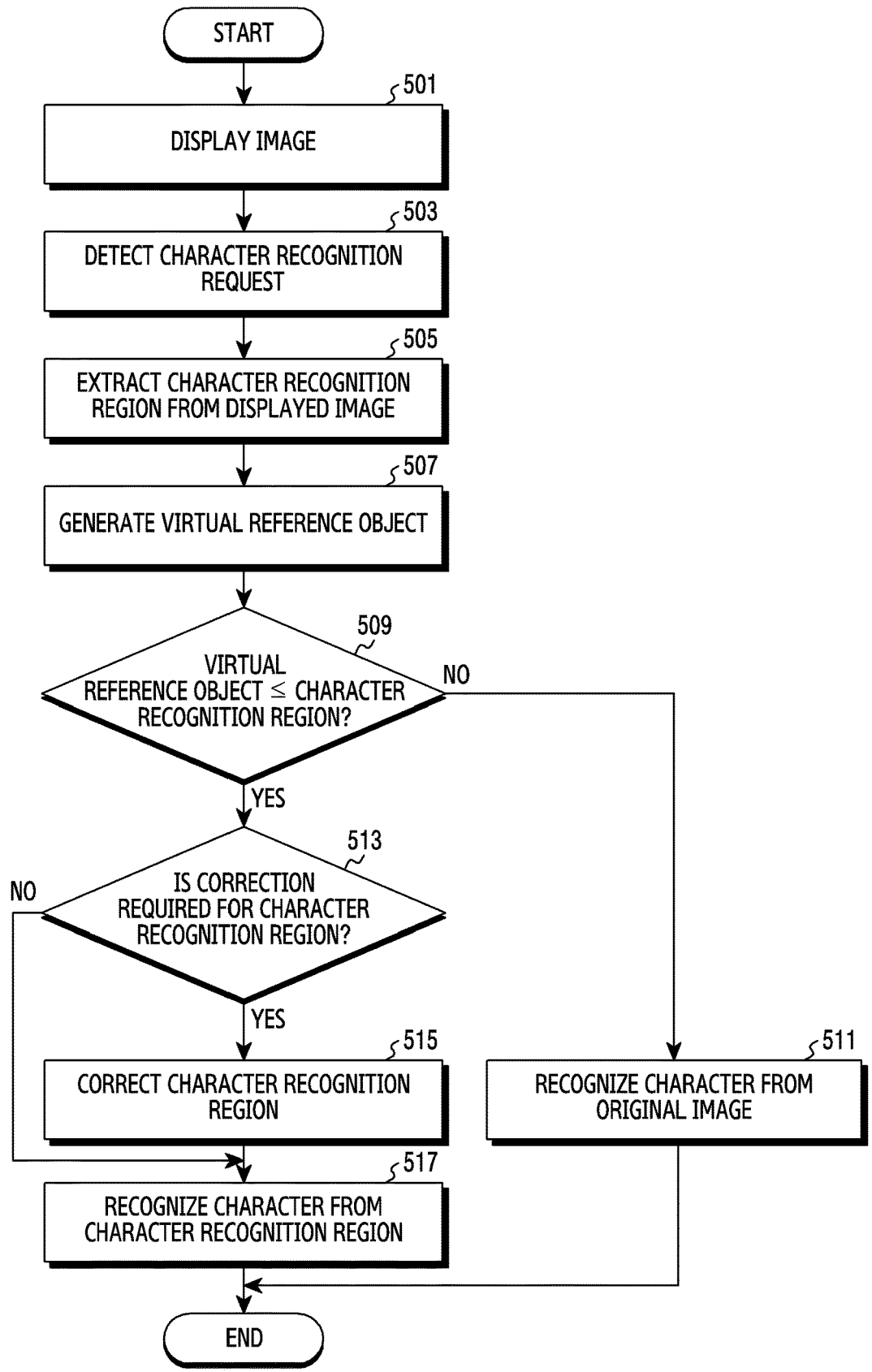
FIG. 5 illustrates a character recognition method for a loaded image of an electronic device according to an embodiment of the present disclosure.
Figure 6:
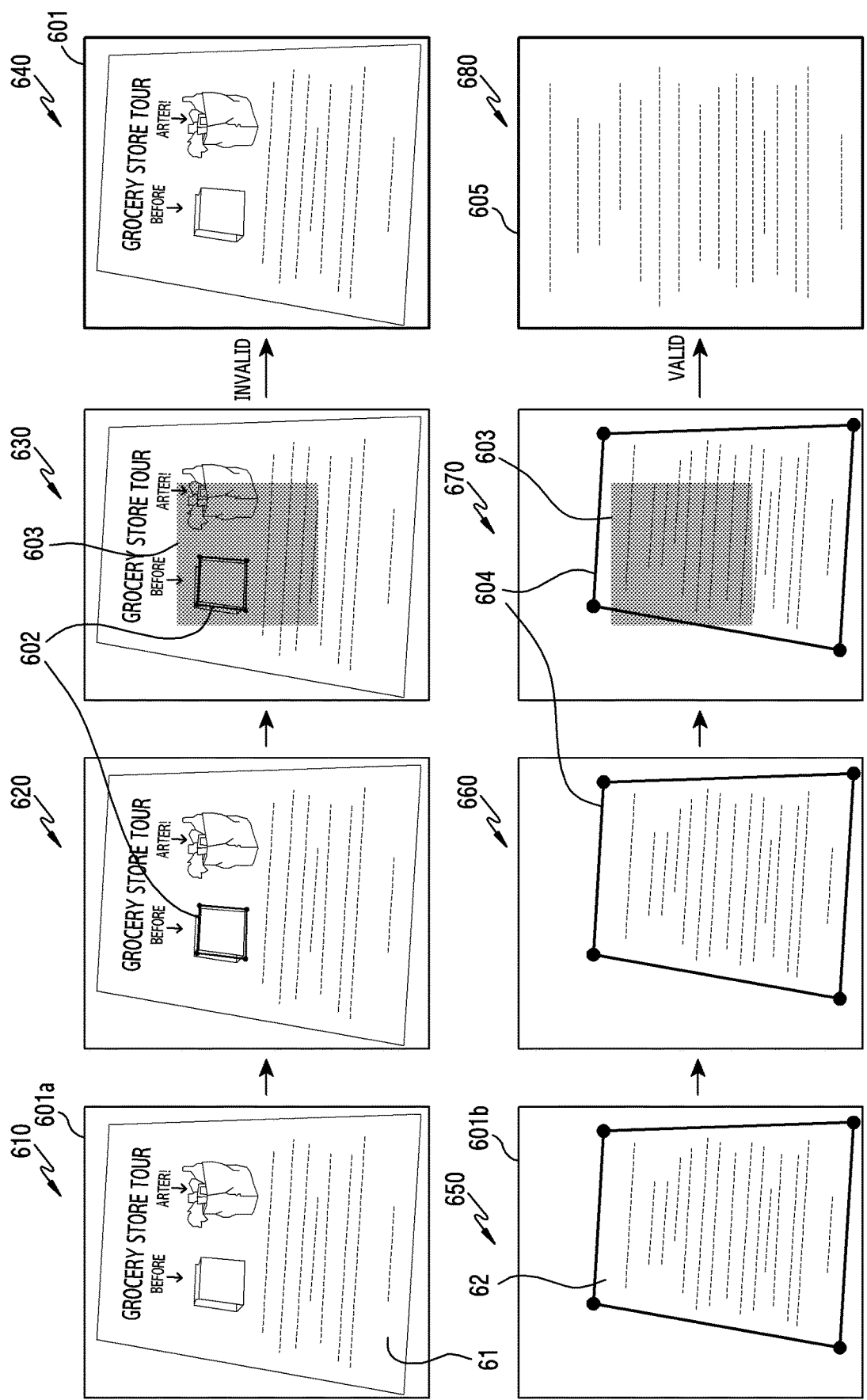
FIG. 6 is an exemplary diagram for explaining a character recognition method for a loaded image of an electronic device according to an embodiment of the present disclosure.

FIG. 5 illustrates a character recognition method for a loaded image of an electronic device according to an embodiment of the present disclosure, and FIG. 6 is an exemplary diagram for explaining a character recognition method for a loaded image of an electronic device according to an embodiment of the present disclosure.

Referring to FIG. 5 and FIG. 6, in operation 501, a processor (e.g., the processor 120 of FIG. 1, the processor 210 of FIG. 2) of an electronic device (e.g., the electronic device 101 of FIG. 1, the electronic device 200 of FIG. 2) according to an embodiment of the present disclosure may load an image (hereinafter, an original image) stored in a memory (e.g., the memory 130 of FIG. 1, the memory 220 of FIG. 2) and display it on a display (e.g., the display device 160 of FIG. 1, the touchscreen display 230 of FIG. 2). For example, as indicated by a reference numeral 610 of FIG. 6, the processor may display an image acquired by capturing a first document 61 on a display as a first original image 601a. The first document 61 may be an advertising leaflet including at least one figure or image (e.g., at least one figure or image having a more dominant edge than an outer edge of the first document) that can be detected as a character recognition region through text edge detection and/or line detection. According to some embodiments, as indicated by a reference numeral 650 of FIG. 6, the processor may display an image acquired by capturing a second document 62 as a second original image 601b. The second document 62 may be, for example, a text document including only a text. According to some embodiments, the second document 62 may be detected through edge detection and/or line detection, but may include at least one figure or image which cannot have a more dominant edge than an outer edge of the second document 62.

In operation 503, the processor according to an embodiment of the present disclosure may sense a character recognition request. For example, the processor may sense a menu for requesting (or instructing) the character recognition or a user input (e.g., key pressing, touch, etc.) for a key.

In operation 505, in response to the sensing of the character recognition request, the processor according to an embodiment of the present disclosure may extract (or recognize) the character recognition region from a displayed image. For example, as indicated by a reference numeral 620 of FIG. 6, the processor may extract a specific object included in the advertising leaflet as a character recognition region (hereinafter, a first character recognition region) 602. This is because the specific object has a dominant edge in the first original image 601a. According to some embodiments, as indicated by a reference numeral 660 of FIG. 6, the processor may extract the document 62 as a character recognition region (hereinafter, a second character recognition region) 604. This is because a boundary of the document has a dominant edge in the second original image 601b. Herein, since a method of extracting the character recognition regions 602 and 604 by using the edge detection and the line detection are the same as described above with reference to FIG. 2B, detailed descriptions thereof will be omitted.

In operation 507, the processor according to an embodiment of the present disclosure may generate a virtual reference object. The virtual reference object may be generated in a specific shape at a designated position (e.g., a center of the image) with a size of a designated ratio (e.g., 2:1) according to width and height sizes of the original image. For example, as indicated by reference numerals 630 and 670 of FIG. 6, the processor 210 may generate a virtual reference object 603 with a rectangular shape having a ¼ size of an original image 610 at a center of the image. According to some embodiments, a shape, size, and/or position of the virtual reference object may vary. Detailed descriptions thereof will be described below.

Meanwhile, although it is illustrated in FIG. 6 for convenience of explanation that the virtual reference object 603 is displayed on the display, the virtual reference object 603 may not be displayed on the display in practice. According to some embodiments, the virtual reference object 603 may be displayed on the display under the intention of a developer or user.

In operation 509, the processor according to an embodiment of the present disclosure may identify whether the character recognition region is larger than or equal to the virtual reference object. According to some embodiments, the processor may identify whether the character recognition region is larger than the virtual reference object.

If the identification result of operation 509 shows that the character recognition region is less than the virtual reference object, in operation 511, the processor may recognize a character from the original image. For example, as indicated by the reference numeral 630 of FIG. 6, if the first character recognition region 602 is less than the virtual reference object 603, the processor may identify that the extracted first character recognition region 602 is invalid, and as indicated by a reference numeral 640, may determine the first original image 601 as the character recognition region and perform character recognition on the first original image 601.

Otherwise, if the identification result of operation 509 shows that the character recognition region is larger than or equal to the virtual reference object, in operation 513, the processor may identify whether the character recognition region requires correction (e.g., inclination correction and/or perspective correction).

If the identification result of operation 513 shows that the character recognition region requires the correction, in operation 515, the processor may perform correction on the extracted character recognition region. For example, the processor may perform the inclination correction and/or perspective correction on the character recognition region. In operation 517, the processor according to an embodiment of the present disclosure may recognize the character from the corrected character recognition region.

For example, as indicated by the reference numeral 670 of FIG. 6, if the second character recognition region 604 is larger than the virtual reference object 603, the processor may determine whether the second character recognition region 604 is inclined in width, height, and depth directions. If it is determined that the second character recognition region 604 is inclined in the width, height, and depth directions, the processor may perform the inclination correction and perspective correction on the extracted second character recognition region 604. As indicated by a reference numeral 680, the processor may perform character recognition on a corrected character recognition region 605.

Otherwise, if the identification result of operation 513 shows that the character recognition region does not require the correction, proceeding to operation 517, the processor may recognize a character from the extracted character recognition region.

The aforementioned embodiment of the present disclosure identifies whether the character recognition region for the character recognition is properly extracted from the image, thereby preventing a character from not being recognized due to wrong extraction of the character recognition region.

Figure 7:
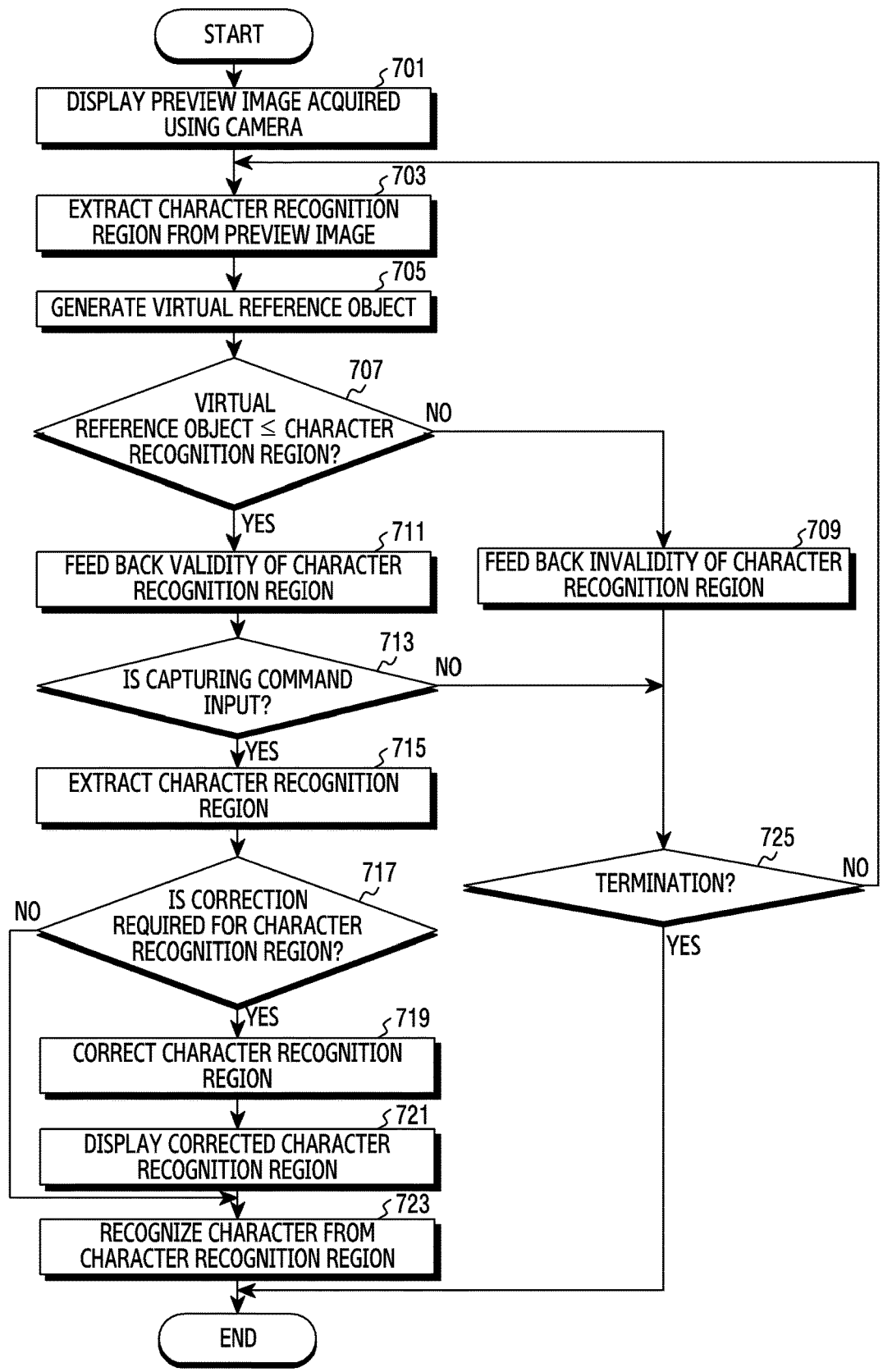
FIG. 7 illustrates a character recognition method for a preview image of an electronic device according to an embodiment of the present disclosure.
Figure 8:
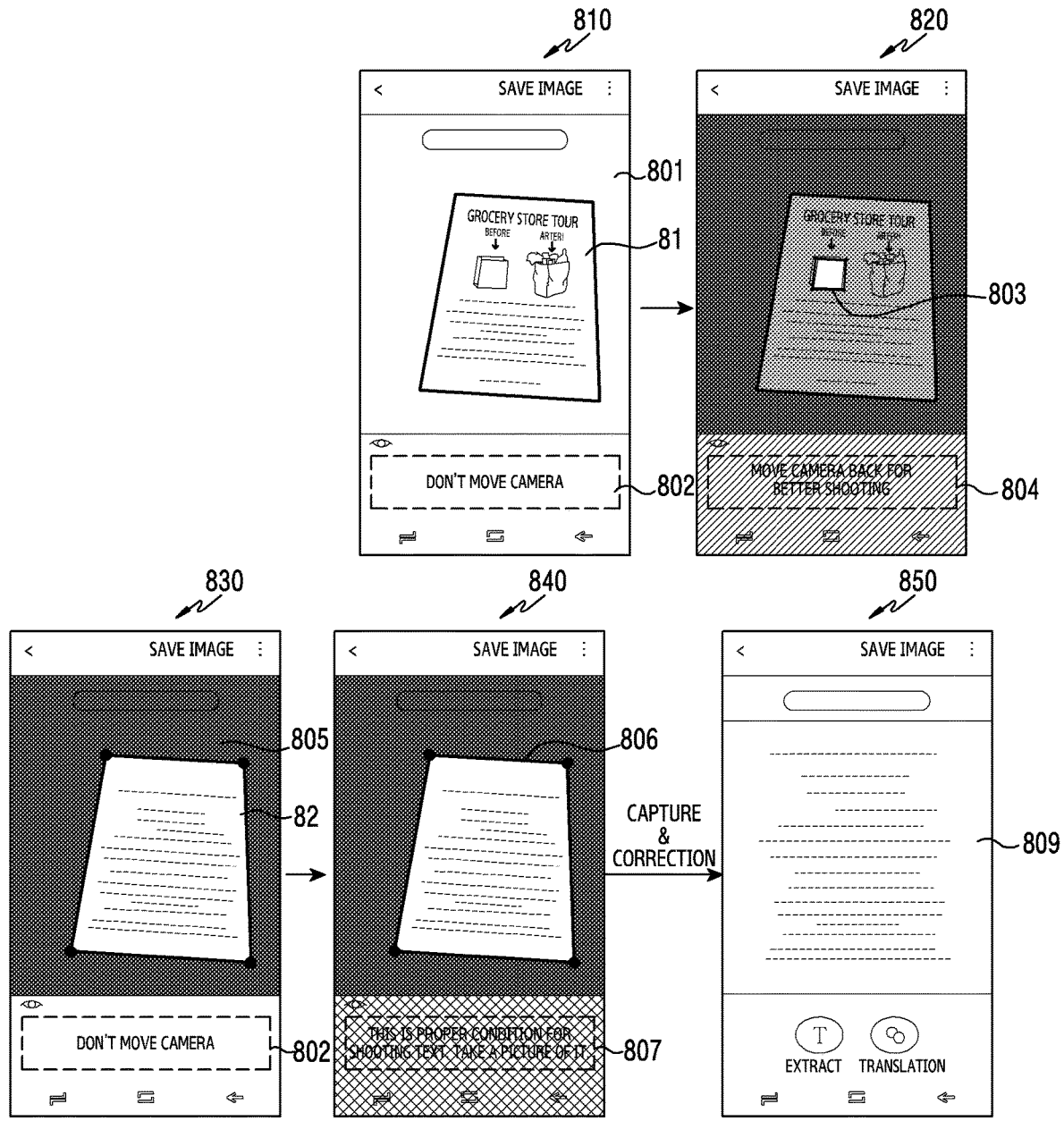
FIG. 8 is an exemplary diagram for explaining a character recognition method for a preview image of an electronic device according to an embodiment of the present disclosure.

FIG. 7 illustrates a character recognition method for a preview image of an electronic device according to an embodiment of the present disclosure, and FIG. 8 is an exemplary diagram for explaining a character recognition method for a preview image of an electronic device according to an embodiment of the present disclosure.

Referring to FIG. 7 and FIG. 8, a processor (e.g., the processor 120 of FIG. 1, the processor 210 of FIG. 2) of an electronic device (e.g., the electronic device 101 of FIG. 1, the electronic device 200 of FIG. 2) according to an embodiment of the present disclosure may display a preview image acquired using an image sensor (e.g., the camera module 180 of FIG. 1, the camera module 240 of FIG. 2) on a display (e.g., the display device 160 oaf FIG. 1, the touchscreen display 230 of FIG. 2). For example, as indicated by a reference numeral 810 of FIG. 8, when a character recognition function (or application) is executed using a camera, the processor may activate a camera module and display, on a display, a first preview image 801 for capturing a first document (e.g., an advertisement leaflet including at least one figure or image having a more dominant edge than an outer edge of a first document) 81 and guide information (hereinafter, first guide information) 802 for correct character recognition. According to some embodiments, as indicated by a reference numeral 830 of FIG. 8, when the character recognition function (or application) is executed, the processor may activate the camera module to display, on the display, a second preview image 805 for capturing a second document (e.g., text document including only a text) 82 and guide information (hereinafter, first guide information) 802 for correct character recognition.

In operation 703, the processor according to an embodiment of the present disclosure may detect the character recognition region from the preview image. For example, the processor may detect the character recognition region based on a dominant edge by using edge detection and line detection. Descriptions thereof will be omitted to avoid redundancy since they are described above with reference to FIG. 2B.

In operation 705, the processor according to an embodiment of the present disclosure may generate a virtual reference object. Herein, detailed descriptions on the virtual reference object will be omitted to avoid redundancy since they are described above with reference to operation 401 of FIG. 4 and operation 507 of FIG. 5.

In operation 707, the processor according to an embodiment of the present disclosure may identify whether the character recognition region is larger than or equal to the virtual reference object. According to some embodiments, the processor may identify whether the character recognition region is larger than the virtual reference object.

If the identification result of operation 707 shows that the character recognition region is smaller than the virtual reference object, in operation 709, the processor may feed back invalidity of the character recognition region (hereinafter, a first feedback), and may proceed to operation 725 to be described below. The first feedback may be provided in various manners including at least one of visual, auditory, and tactile senses. For example, as indicated by a reference numeral 820 of FIG. 8, the processor may perform dimming processing on a region (hereinafter, a third character recognition region) 803 other than the character recognition region detected from the first preview image 801. In addition, in order to feed back the invalidity of the third character recognition region 803, the processor may change the previous first guide information 802 to guide information (e.g., second guide information) 804 which guides manipulation of the electronic device, and may change a background of a region for displaying the second guide information 804 to a first color. This is for exemplary purposes only, and thus the embodiment of the present disclosure is not limited thereto. For example, the processor according to an embodiment of the present disclosure may feed back the invalidity of the third character recognition region 803 by using a size, type, color or transparency change of a character, screen flickering, sound effect output, vibration output, or the like.

On the other hand, if the identification result of operation 707 shows that the character recognition region is larger than or equal to the virtual reference object, in operation 711, the processor may feed back validity of the character recognition region (hereinafter, a second feedback). The second feedback may be provided in various manners including at least one of visual, auditory, and tactile senses. For example, as indicated by a reference numeral 840 of FIG. 8, the processor may perform dimming processing on a region (hereinafter, a fourth character recognition region) 806 other than the character recognition region detected from the second preview image 805. In addition, in order to feed back the validity of the fourth character recognition region 806, the processor may change the first guide information 802 to third guide information 807 which guides shooting (capturing), and may change a background of a region for displaying the third guide information 807 to a second color different from the first color. This is for exemplary purposes only, and thus the embodiment of the present disclosure is not limited thereto. The processor may feed back the validity of the fourth character recognition region 806 similarly to the aforementioned various methods.

In operation 713, the processor according to an embodiment of the present disclosure may identify whether a capturing (shooting) command is input. If the identification result of operation 713 shows that the capturing command is not input, in operation 725, the processor may identify whether a termination (e.g., a termination of a character recognition function using a camera) is requested. If the identification result of operation 725 shows that the termination is not requested, returning to operation 703, the processor may repeat the aforementioned operations. Otherwise, if the termination is requested, the processor may terminate the character recognition function (application).

Meanwhile, if the identification result of operation 713 shows that the capturing command is input, in operation 715, the processor may capture a preview image and may extract (e.g., crop) the character recognition region from the captured image. For example, the processor may capture the second preview image 805, and may extract the fourth character recognition region 806 from the captured image. The operation 715 may be performed in background.

In operation 717, the processor according to an embodiment of the present disclosure may identify whether the character recognition region requires correction (e.g., inclination correction and/or perspective correction). If the identification result of operation 717 shows that the character recognition region does not require the correction, proceeding to operation 723, the processor may recognize a character from the extracted character recognition region.

Otherwise, if the identification result of operation 717 shows that the character recognition region requires correction, the processor may perform correction on the extracted character recognition region in operation 719, and may display the corrected character recognition region on a display in operation 721. For example, as indicated by a reference numeral 850 of FIG. 8, the processor may perform inclination correction and perspective correction on the fourth character recognition region 806, and may display a corrected character recognition region 809 on the display.

In operation 723, the processor according to an embodiment of the present disclosure may recognize a character from the corrected character recognition region.

An embodiment of the aforementioned present disclosure provides a feedback for validity of a character recognition region when an image is captured to recognize a character, thereby improving user's convenience.

Figure 9:
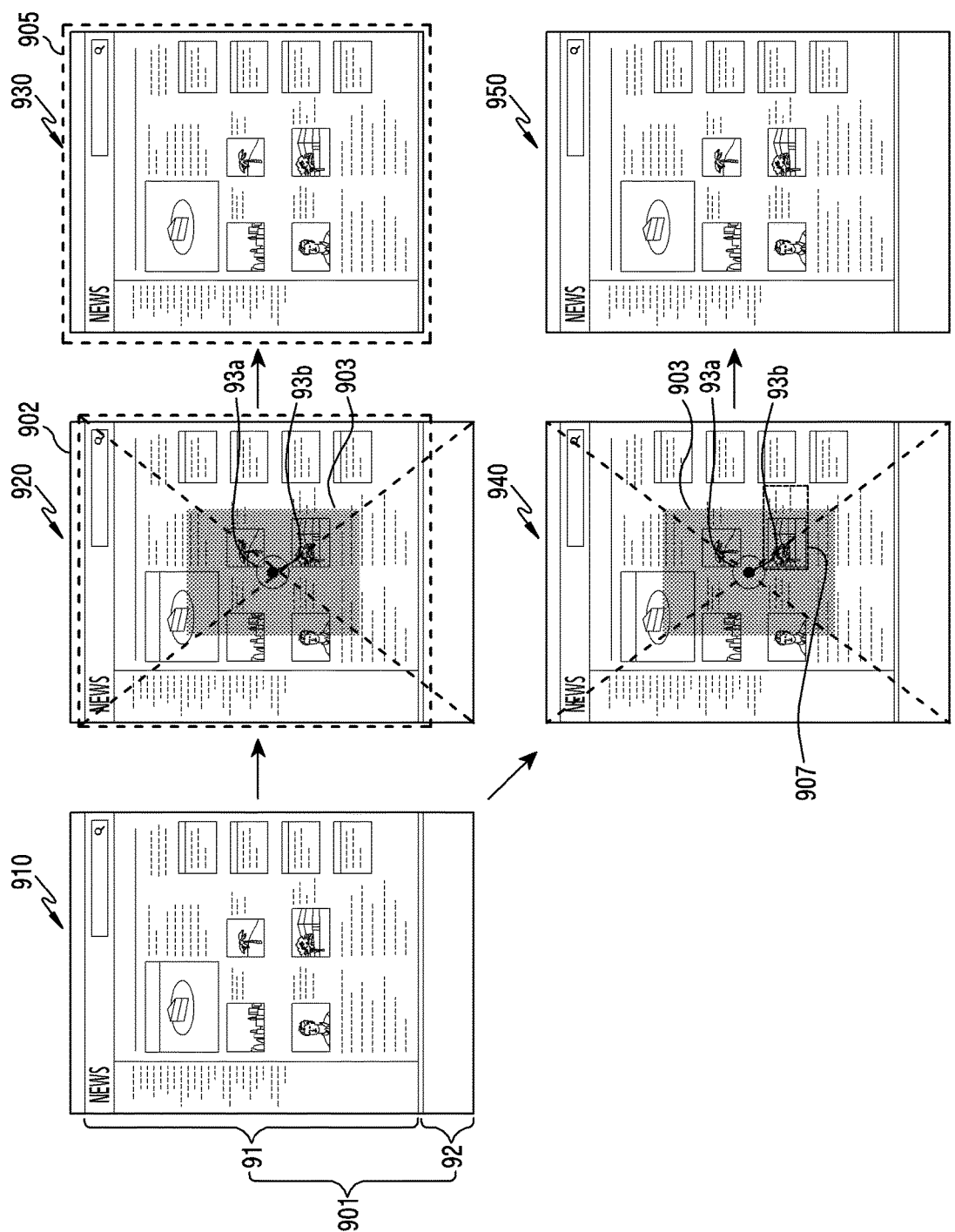
FIG. 9 is an exemplary diagram for explaining a method of determining a size and position of a virtual reference object by using information of an image size according to an embodiment of the present disclosure.

FIG. 9 is an exemplary diagram for explaining a method of determining a size and position of a virtual reference object by using information of an image size according to an embodiment of the present disclosure.

Referring to FIG. 9, an electronic device (e.g., the electronic device 101 of FIG. 1, the electronic device 200 of FIG. 2) according to an embodiment of the present disclosure may display an image 901 for character recognition, as indicated by a reference numeral 910, on a display (e.g., the display device 160 of FIG. 1, the touchscreen display 230 of FIG. 2). The image 901 is an image captured from a web page, and may include a content region 91 and a margin region 92.

Upon requesting character recognition on the image 901, the electronic device may extract the character recognition region from the image, and may generate a virtual reference object. For example, as indicated by a reference numeral 920, the electronic device may extract the content region 91 other than the margin region 92 from the image 901 as a character recognition region 902, and may generate a virtual reference object 903 based on a predetermined rule.

The predetermined rule may be a designated ratio of a size of the image 901 and a center of the image. For example, if the image 901 has a size of 1024×768 and the ratio of the image and the virtual reference object is set to 2:1, the electronic device may generate a virtual reference object with a size of 512×384, and a center point 93a of the generated virtual reference object 903 may be matched to a center point 93b of the image 901. Although the virtual reference object 903 is illustrated in FIG. 9 for convenience of explanation, the virtual reference object 903 may not be visually displayed on a screen. According to some embodiments, the virtual reference object 903 may be displayed on the screen under the intention of a developer or user.

If the character recognition region 902 is larger than the virtual reference object 903 as indicated by a reference numeral 920, the electronic device may determine that the extracted character recognition region 902 is valid as indicated by a reference numeral 930, and thus may crop the character recognition region 902 from the image 901 and recognize a character.

Meanwhile, as indicated by a reference numeral 940, the electronic device may extract a part of the content region 91 as a character recognition region 907, and may generate the virtual reference object 903 based on a predetermined rule. If the character recognition region 907 is smaller than the virtual reference object 903 as indicated by the reference numeral 940, the electronic device may determine that the extracted character recognition region 907 is invalid, and thus may recognize a character from the image 901 as indicated by a reference numeral 950.

Figure 10:
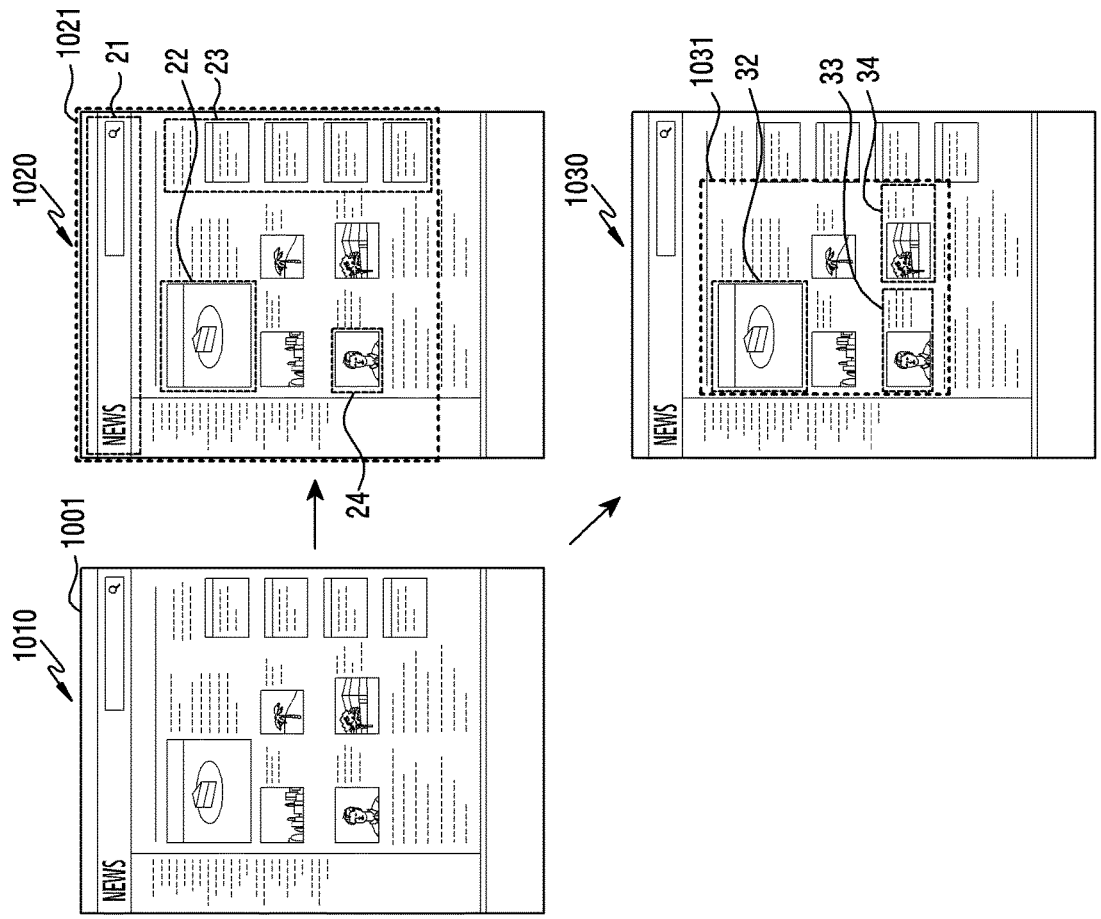
FIG. 10 is an exemplary diagram for explaining a method of varying a size and position of a virtual reference object by using a salient map according to an embodiment of the present disclosure.

FIG. 10 is an exemplary diagram for explaining a method of varying a size and position of a virtual reference object by using a salient map according to an embodiment of the present disclosure.

Referring to FIG. 10, as indicated by a reference numeral 1010, an electronic device (e.g., the electronic device 101 of FIG. 1, the electronic device 200 of FIG. 2) according to an embodiment of the present disclosure may display an image 1001 for character recognition on a display (e.g., the display 160 of FIG. 1, the display 230 of FIG. 2). For example, the image 1001 may include a plurality of regions (hereinafter, segmented regions) which are dividable through edge detection and line detection.

If character recognition is requested for the image 1001, the electronic device may generate a salient map for the image 1001. The salient map may be generated by dividing the image into at least one region (hereinafter, a segmented region) according to visual importance. The electronic device may generate a virtual reference object to include at least one segmented region of which visual importance is greater than or equal to a designated threshold. For example, as indicated by a reference numeral 1020, the electronic device may generate a virtual reference object 1021 to include (e.g., cover) four segmented regions 21, 22, 23, and 24.

According to some embodiments, as indicated by a reference numeral 1030, the electronic device may generate a virtual reference object 1031 to include three segmented regions 32, 33, and 34.

According to some embodiments, the electronic device may generate the virtual reference object by considering a user input. For example, upon sensing an input (e.g., a touch input, a hover input, etc.) for a specific segmented region, the electronic device may generate the virtual reference object to include the specific segmented region.

According to some embodiments, the electronic device may move the virtual reference object by considering the user input. For example, upon sensing an input (e.g., a touch input, a hover input, etc.) on the image 1001 after generating the virtual reference object, the electronic device may display this by setting and moving a center point of the virtual reference object around an input position.

As such, an electronic device according to an embodiment of the present disclosure can vary a size and position of a virtual reference object to cover a region having high visual importance on an image and a segmented region depending on a user input, thereby improving efficiency of character recognition.

Figure 11:
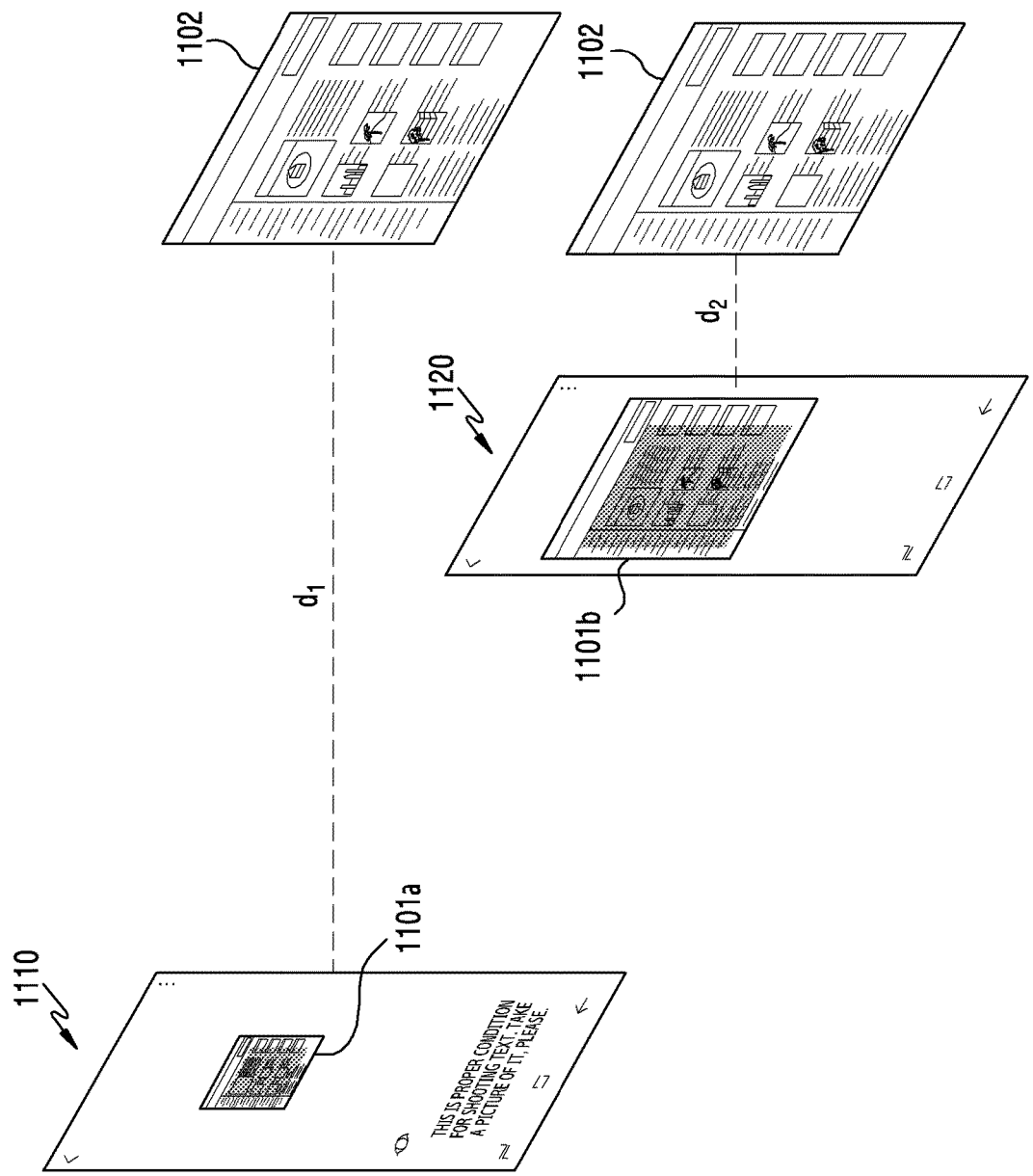
FIG. 11 is an exemplary diagram for adjusting a size of a virtual reference object by using distance information according to an embodiment of the present disclosure.

FIG. 11 is an exemplary diagram for adjusting a size of a virtual reference object by using distance information according to an embodiment of the present disclosure.

Referring to FIG. 11, an electronic device (e.g., the electronic device 101 of FIG. 1, the electronic device 200 of FIG. 2) according to an embodiment of the present disclosure may adjust a size of a virtual reference object by using information of a distance to a subject. For example, when a subject 1102 is located at a first distance d1, the electronic device may generate a virtual reference object 1101a with a first size, as indicated by a reference numeral 1110. Alternatively, when the subject 1102 is located at a second distance d2, the electronic device may generate a virtual reference object 1101b with a second size, as indicated by a reference numeral 1120. Herein, the distance to the subject may be identified in various manners. For example, when an image includes depth information, the distance information may be extracted from metadata of the image. Alternatively, when a depth camera is included, the distance information may be measured by the depth camera. Alternatively, when a dual camera is included, disparity, baseline, and focal length of the dual camera may be used in calculation.

As described above, the electronic device according to an embodiment of the present disclosure can vary a size of a virtual reference object based on a distance to a subject (e.g., a business card, a signboard, a document, etc.) for character recognition. This is to avoid error occurrence for validity verification of character recognition since a subject becomes smaller in proportion to the distance whereas a size of the entire image acquired through a camera module is constant. For example, when a subject (e.g., a document) included in an image acquired through the camera module is smaller than a virtual reference object having a size determined by considering a size of the entire image, the processor can avoid an error in which, even if the entire document is properly extracted (detected) as the character recognition region, invalidity is determined since an extracted character recognition region is smaller than the virtual reference object.

Figure 12:
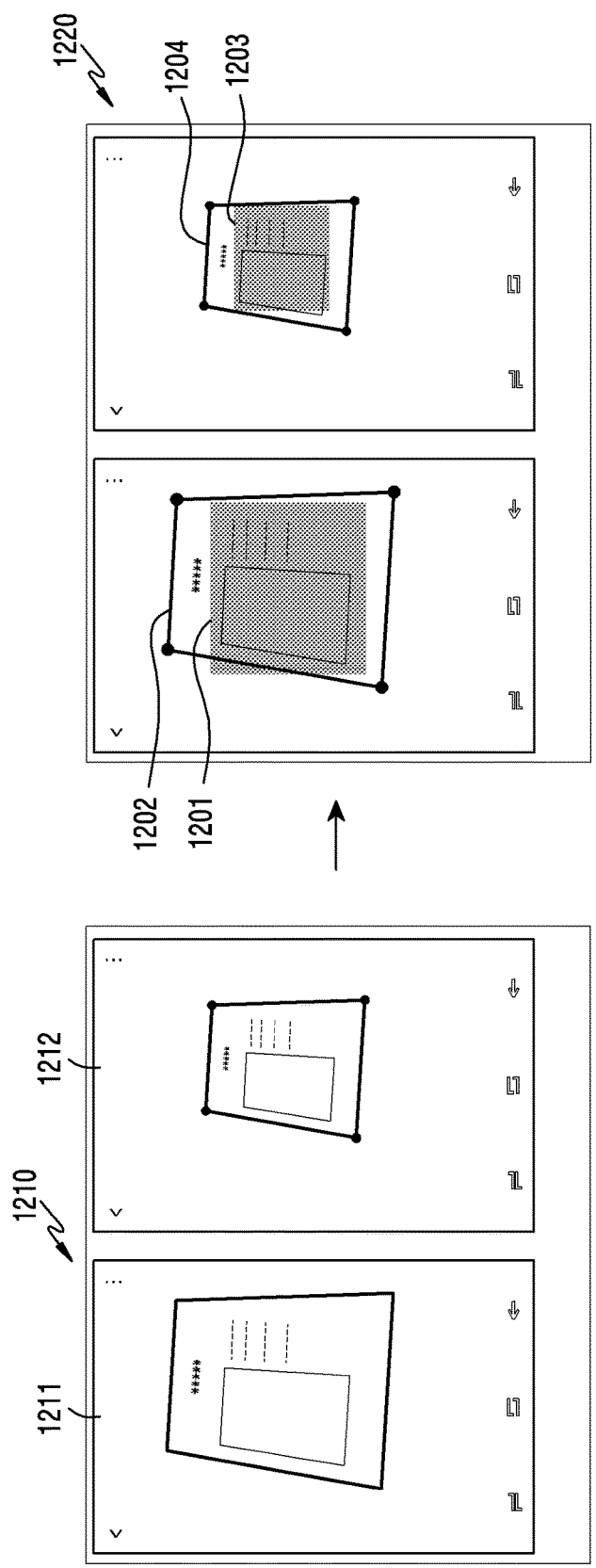
FIG. 12 is an exemplary diagram for adjusting a size of a virtual reference object by using magnification information according to an embodiment of the present disclosure.

FIG. 12 is an exemplary diagram for adjusting a size of a virtual reference object by using magnification information according to an embodiment of the present disclosure.

Referring to FIG. 12, an electronic device (e.g., the electronic device 101 of FIG. 1, the electronic device 200 of FIG. 2) according to an embodiment of the present disclosure may capture a subject by using a dual camera. Herein, a magnification of the dual camera may be individually adjusted. For example, as indicated by a reference numeral 1210, the electronic device may capture the subject with a 2× magnification of a first camera to display a first preview image 1211, and may capture the subject with a default magnification (e.g., a 1× magnification) of a second camera to display a second preview image 1212.

As indicated by a reference numeral 1220, the electronic device according to an embodiment of the present disclosure can vary a size of a virtual reference object according to a magnification of each camera. For example, a virtual reference object 1201 for the first camera may be larger than a virtual reference object 1203 of the second camera. In this case, a first character recognition region 1202 detected from an image acquired using the first camera is larger than the first virtual reference object 1201, and thus may be determined to be valid. In addition, a second character recognition region 1204 detected from an image acquired using the second camera is larger than the second virtual reference object 1203, and thus may be determined to be valid.

As described above, an electronic device according to an embodiment of the present disclosure can vary a size of a virtual reference object based on magnification information.

Although the dual camera is used in the above description, the embodiment of varying the size of the virtual reference object based on the magnification information may also be applied to an electronic device including a single camera.

According to some embodiments, the electronic device may determine the size of the virtual reference object based on an activated camera. For example, the electronic device may generate a virtual reference object with a first size if the first camera is activated, and may generate a virtual reference object with a second size if the second camera is activated. This is because a size of an acquired image may differ depending on camera performance. For example, a virtual reference object related (mapped) to a wider wide-angle camera than a standard camera may have a smaller size than a virtual reference object related to the standard camera.

Figure 13:
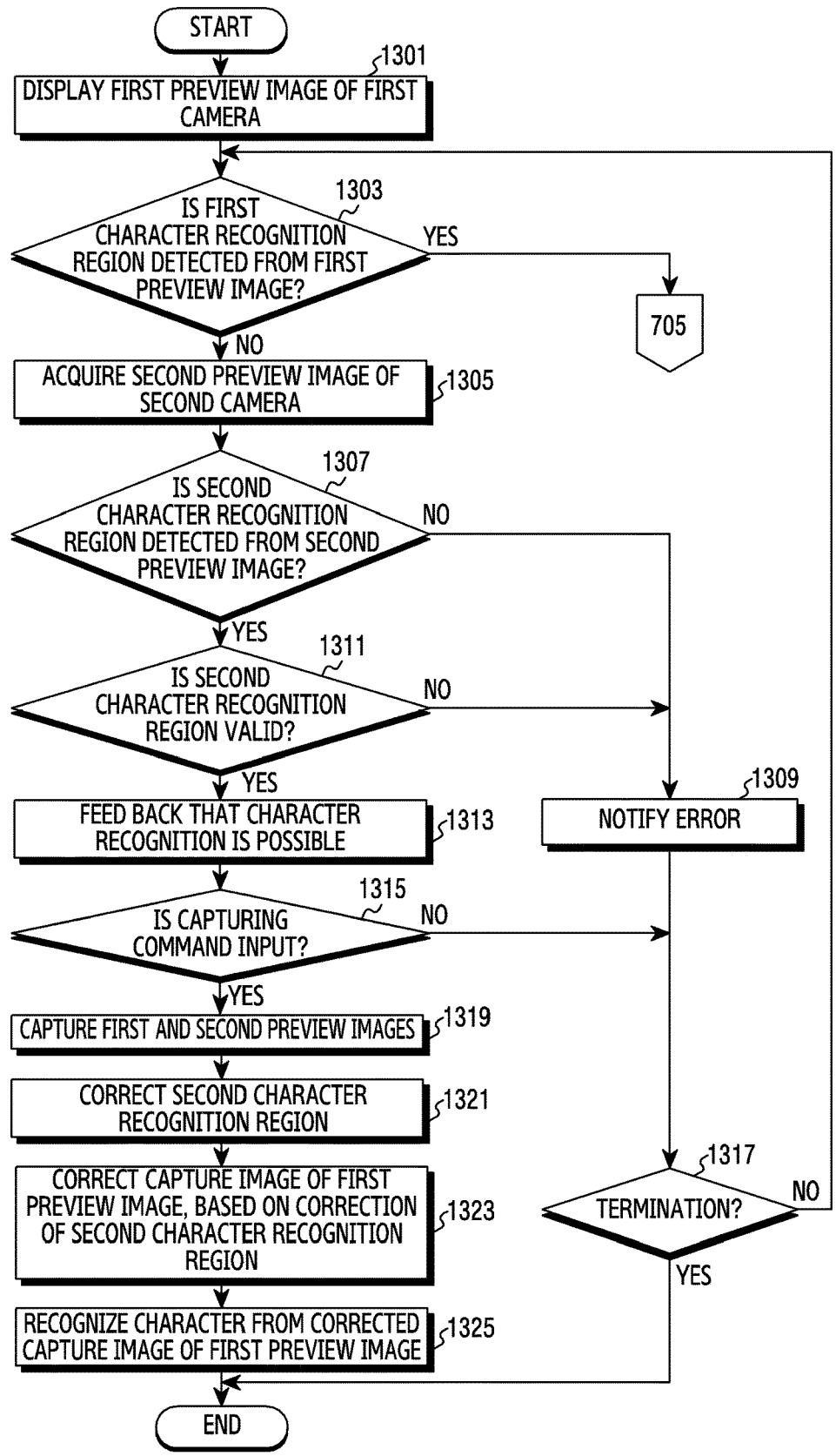
FIG. 13 is a flowchart illustrating a character recognition method of an electronic device including a dual camera according to an embodiment of the present disclosure.
Figure 14A:
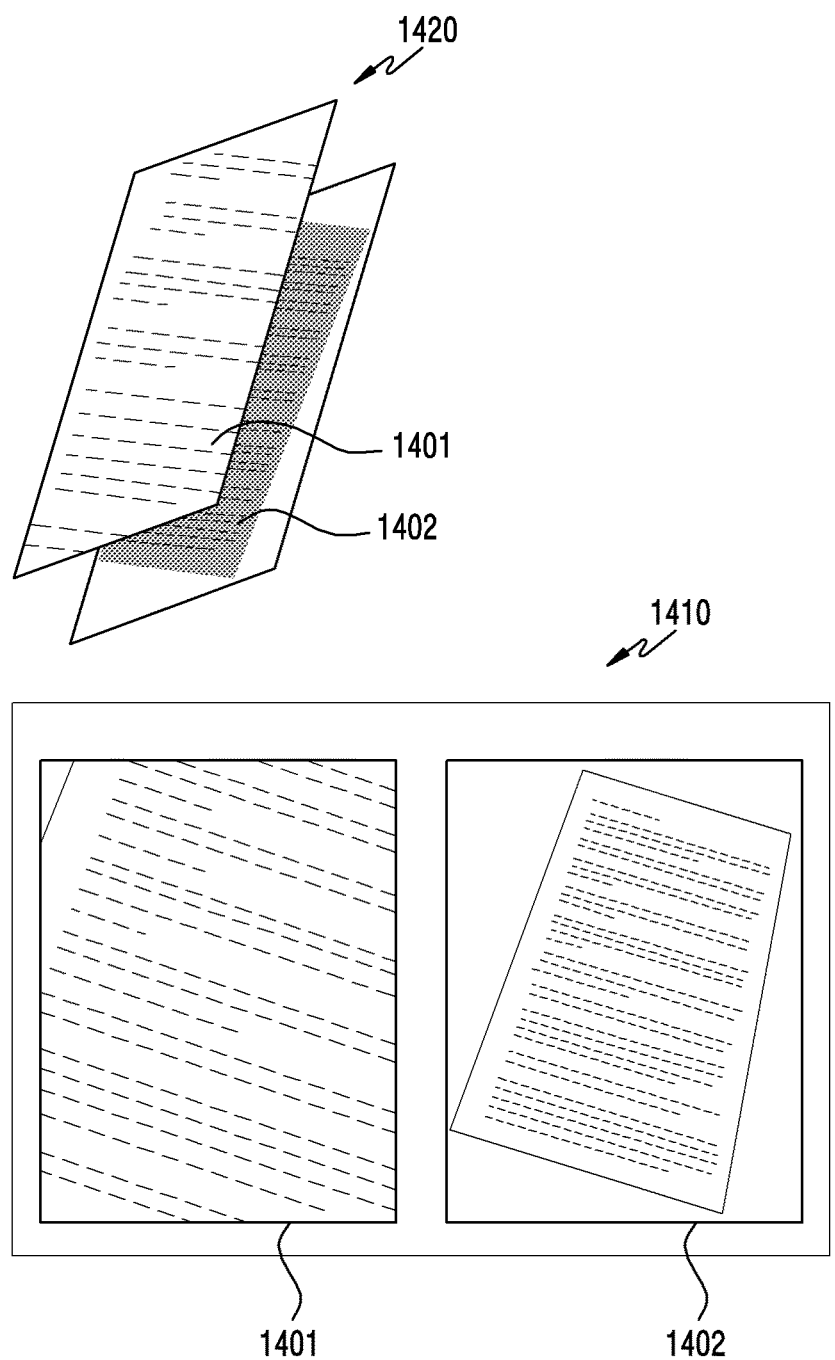
FIGS. 14A, 14B, and 14C are exemplary diagrams for explaining a character recognition method of an electronic device including a dual camera according to an embodiment of the present disclosure.
Figure 14B:
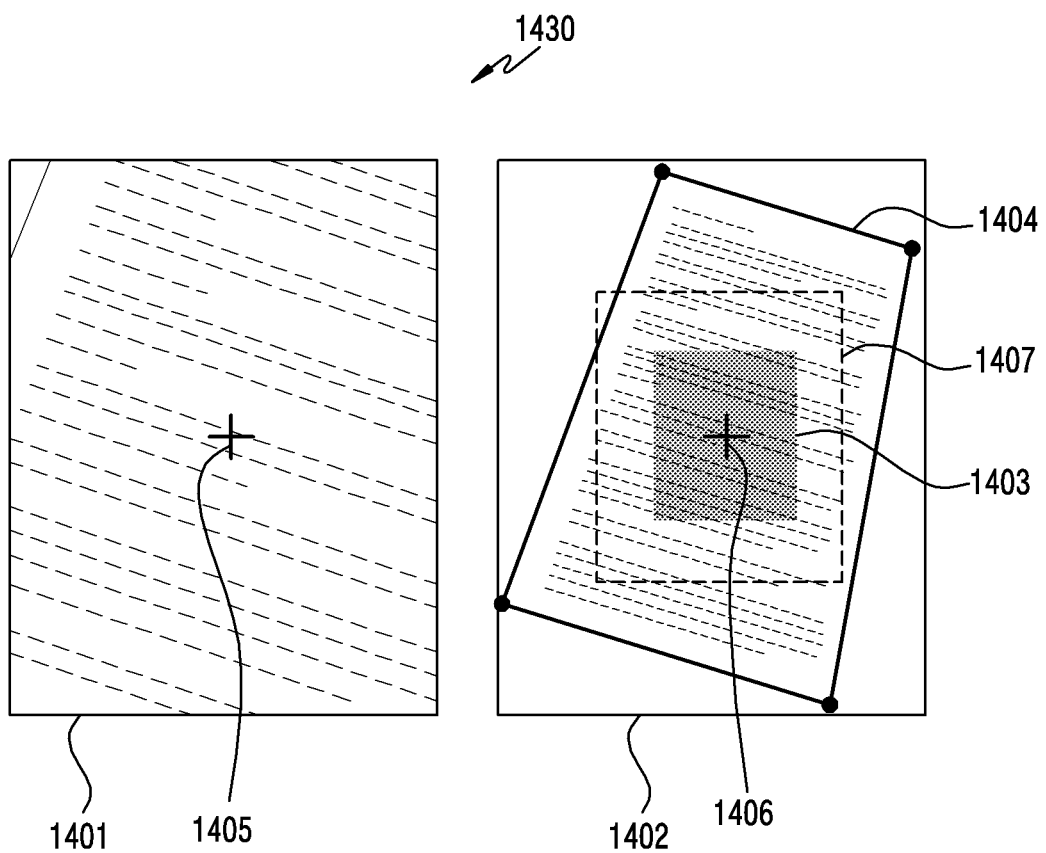
Figure 14C:
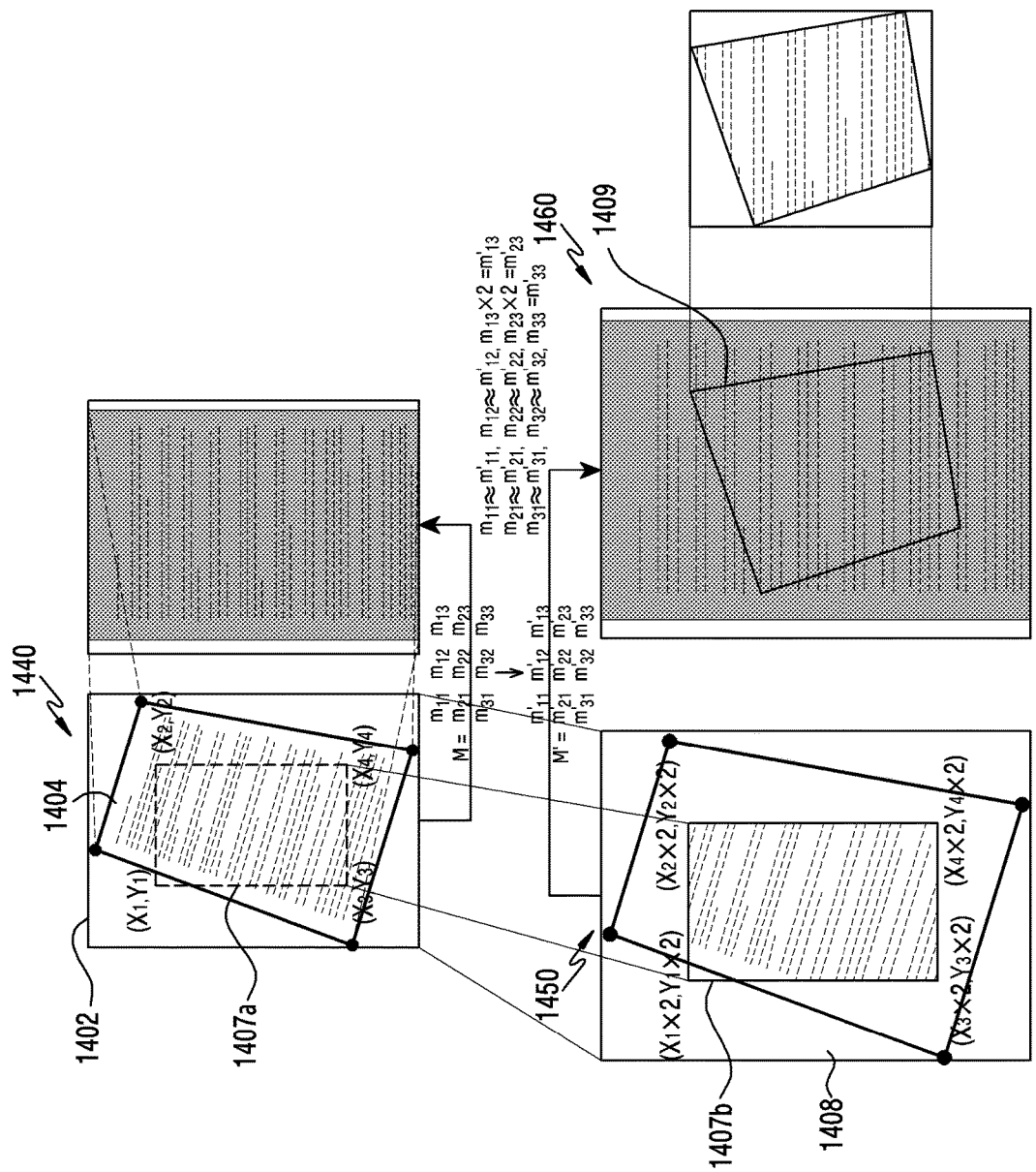

FIG. 13 is a flowchart illustrating a character recognition method of an electronic device including a dual camera according to an embodiment of the present disclosure, and FIG. 14A to FIG. 14C are exemplary diagrams for explaining a character recognition method of an electronic device including a dual camera according to an embodiment of the present disclosure.

Referring to FIG. 13 to FIG. 13C, in operation 1301, a processor (e.g., the processor 120 of FIG. 1, the processor 210 of FIG. 2) of an electronic device (e.g., the electronic device 101 of FIG. 1, the electronic device 200 of FIG. 2) according to an embodiment of the present disclosure may display a first preview image acquired using a first camera on a display (e.g., the display device 160 of FIG. 1, the touchscreen display 230 of FIG. 2).

In operation 1303, the processor according to an embodiment of the present disclosure may identify whether a first character recognition region is detected from the first preview image. If the identification result of operation 1303 shows that the first character recognition region is detected, the processor may return to the aforementioned operation 705 of FIG. 7. Otherwise, if the identification result of operation 1303 shows that the first character recognition region is not detected, in operation 1305, the processor may acquire a second preview image by using a second camera.

For example, as indicated by a reference numeral 1410 of FIG. 14A, the processor may display a first preview image 1401 on a display when a character recognition function (or application) is performed using a dual camera. The first preview image 1401 may be in a state of being enlarged (e.g., 2× zoom) in response to a user request. Since an edge region cannot be detected due to the enlargement of the first preview image 1401, the processor cannot detect the first character recognition region from the first preview image 1401. The processor may activate a second camera to acquire a second preview image 1402. Herein, as indicated by a reference numeral 1420, the second preview image 1402 may be virtually generated behind the first preview image 1401 and thus may not be displayed in practice on the display. According to some embodiments, the electronic device may display the second preview image 1402 together with the first preview image 1401 on the display by using a multi-screen.

In operation 1307, the processor according to an embodiment of the present disclosure may identify whether a second character recognition region is detected from the second preview image. If the identification result of operation 1307 shows that the second character recognition region is not detected, in operation 1309, the processor may perform error notification. For example, the processor may notify a user via at least one of visual, auditory, and tactile senses that it is in a state where the character cannot be recognized.

If the identification result of operation 1307 shows that the second character recognition region is detected, in operation 1311, the processor may identify whether the second character recognition region is valid. For example, as indicated by a reference numeral 1430 of FIG. 14B, the processor may generate a virtual reference object 1403, and may identify whether a second character recognition region 1404 is larger than or equal to (or larger than) the virtual reference object. Since a center axis 1405 of the first preview image 1401 matches to a center axis 1406 of the second preview image 1402, the processor may identify that the first preview image 1401 corresponds to a specific portion of the second preview image 1402. According to some embodiments, if the center axis 1405 of the first preview image 1406 does not match to the center axis 1406 of the first preview image 1402, the processor may match the center axis. According to some embodiments, if the second preview image 1402 is displayed on the display by using a multi-screen, the electronic device may output a symbol (e.g., a dotted rectangular box) 1407 indicating a region, which corresponds to the first preview image 1401, on the second preview image 1402.

If the identification result of operation 1311 shows that the second character recognition region is invalid, in operation 1309, the processor may perform error handling. For example, the processor may notify the user in various manners such as visual, auditory, tactile feedback, or the like that the character recognition is impossible.

If the identification result of operation 1311 shows that the second character recognition region is valid, in operation 1313, the processor may feed back that character recognition is possible.

In operation 1316, the processor according to an embodiment of the present disclosure may identify whether a capturing (shooting) command is input. If the identification result of operation 1315 shows that the capturing command is not input, in operation 1317, the processor may identify whether a termination is requested. If the identification result of operation 1317 shows that the termination is not requested, returning to operation 1303, the processor may repeat the aforementioned operations. Otherwise, if the termination is requested, the processor may terminate the character recognition function.

If the identification result of operation 1315 shows that the capturing command is input, in operation 1319, the processor may capture the first preview image and the second preview image.

In operation 1321, the processor according to an embodiment of the present disclosure may correct the second character recognition region. For example, the processor may extract (or crop) the second character recognition region from the captured second preview image, identify whether the extracted second character recognition region has distortion caused by an inclination or a perspective, and if correction is required, perform inclination correction and/or perspective correction on the extracted second character recognition region.

For example, as indicated by a reference numeral 1440 of FIG. 14C, the processor may calculate correction information (e.g., a first matrix) M for correcting the second character recognition region 1404. In addition, a characteristic difference (e.g., magnification information, depth information, etc.) of the first camera and second camera may be used to acquire correction information (e.g., a second matrix) M' for correcting a capture image of a first preview image. For example, if the first camera and the second camera have the same specification and the first preview image corresponds to a 2× magnification, a first row and third column and a second row and third column of the second matrix M' may have a value similar to two times a value of a first row and third column and a second row and third column of the first matrix M, and the remaining matrix values of the second matrix M' may have values respectively similar to the remaining matrix values of the first matrix M. These values are for exemplary purposes only, and thus embodiments of the present disclosure are not limited thereto.

Coordinates $(X_1, Y_1)$, $(X_2, Y_2)$, $(X_3, Y_3)$, and $(X_4, Y_4)$ of a region 1407a corresponding to the first preview image on the second preview image 1402 may be converted using the characteristic information to change the coordinates into coordinates of the first preview image. For example, since the first preview image corresponds to a 2× magnification, coordinates $(X_1, Y_1)$, $(X_2, Y_2)$, $(X_3, Y_3)$, and $(X_4, Y_4)$ of the region 1407a may be converted into coordinates $(X_1 \times 2, Y_1 \times 2)$, $(X_2 \times 2, Y_2 \times 2)$, $(X_3 \times 2, Y_3 \times 2)$, and $(X_4 \times 2, Y_4 \times 2)$ increased by 2-fold, as indicated by a reference numeral 1450.

In operation 1323, the processor according to an embodiment of the present disclosure may correct the capture image of the first preview image, based on the second character recognition region. For example, as indicated by a reference numeral 1450, the processor may convert a coordinate of the region 1407a to acquire a capture image 1407b of the first preview image, may apply (e.g., compute) the second matrix M' to the acquired coordinate, and may acquire a correction image 1409 corrected from the capture image 1407b of the first preview image as indicated by a reference numeral 1460.

In operation 1325, the processor according to an embodiment of the present disclosure may recognize a character from the capture image of the corrected first preview image.

The aforementioned embodiment of the present disclosure may improve a character recognition rate by detecting a character recognition region via the second camera even if the character recognition region cannot be detected by using the first camera.

According to some embodiments, operation 1321 may be omitted. For example, the processor may calculate a first correction value (e.g., a first matrix M) for correction without having to correct the second character recognition region, and may calculate (compute) the second correction value (e.g., a second matrix M') based on the first correction value to correct the capture image of the first preview image.

According to some embodiments, operation 1315 may be omitted. For example, when it is configured to recognize a character from the preview image on a real-time basis, instead of waiting for reception of a separate capturing command, the processor may automatically perform operation 1319 if the second character recognition region is valid in operation 1311.

According to some embodiments, the processor may recognize the character by using the capture image of the second preview image. For example, the processor may enlarge the capture image of the second preview image to correspond to a zoom magnification of the first preview image, correct the enlarged capture image, and extract a region corresponding to the region 1407a from the corrected image to recognize the character from the extracted region.

According to some embodiments, the processor may recognize the character by using the capture image of the first preview image or by using the capture image of the second preview image, based on quality of the capture image of the first preview image. For example, if the quality of the capture image of the first preview image exceeds a designated value (e.g., quality capable of recognizing the character), as shown in FIG. 13 above, the processor may recognize the character by correcting the capture image of the first preview image. Otherwise, if the first preview image is enlarged through digital zoom and thus the quality of the capture image is less than the designated value (e.g., quality in which a character recognition rate may be less than or equal to a predetermined value) and if the second camera supports optical zoom, a capture image corresponding to the first preview image may be acquired by using the optical zoom of the second camera, and the character may be recognized by using the acquired capture image.

A character recognition method of an electronic device (e.g., the electronic device 101 of FIG. 1, the electronic device 200 of FIG. 2) according to various embodiments of the present disclosure may include extracting a character recognition region from an image displayed on a display (e.g., the display device 160 of FIG. 1, the touchscreen display 230 of FIG. 2), identifying whether the extracted character recognition region is valid, and recognizing a character from the character recognition region if the character recognition region is valid.

According to various embodiments, the method may further include recognizing a character from the displayed image if the character recognition is invalid.

According to various embodiments, the identifying whether the extracted character recognition region is valid may include generating a virtual reference object based on a predetermined rule, comparing the virtual reference object with the character recognition region, determining that the character recognition region is valid if the character recognition region is larger than the virtual reference object, and determining that the character recognition region is invalid if the character recognition region is smaller than the virtual reference object.

According to various embodiments, the generating of the virtual reference object based on the predetermined rule may include generating the virtual reference object so as to have a size of a designated ratio with respect to a size of the displayed image and to be located at a center of the displayed image.

According to various embodiments, the generating of the virtual reference object based on the predetermined rule may include generating a salient map for a dividable region of the display image according to visual importance, and generating the virtual reference object to include at least one segmented region of which visual importance is greater than or equal to a designated threshold and at least one of regions based on a user input.

According to various embodiments, the generating of the virtual reference object based on the predetermined rule may include determining a size of the virtual reference object based on at least one of shooting distance information of the displayed image, information of an activated camera among a plurality of cameras, and magnification information.

According to various embodiments, the generating of the virtual reference object based on the predetermined rule may include identifying whether the character recognition region requires correction, and if the correction is required, correcting the character recognition region, and recognizing a character from the corrected character recognition region.

According to various embodiments, the method may further include providing a feedback regarding whether the character recognition region is valid if the displayed image is a preview image.

According to various embodiments, the recognizing of the character may include capturing the character recognition region detected from the preview image, and recognizing a character from the captured character recognition region.

According to various embodiments, the method may further include, if the displayed image is a first preview image acquired using a first camera, and if the character recognition region is not detected from the first preview image, extracting a character recognition region from a capture image of a second preview image acquired using at least one different camera, correcting the character recognition region extracted from the capture image of the second preview image, correcting the capture image of the first preview image based at least in part on correction information for the character recognition region extracted from the capture image of the second preview image, and recognizing a character from the corrected capture image of the first preview image.

Various embodiments of the present disclosure can prevent erroneous detection of a character recognition region by identifying validity of the character recognition region, and can prevent a recognition rate from being decreased due to the erroneous detection. Various embodiments of the present disclosure can improve accuracy of detection of the character recognition region by properly adjusting a position and/or size of a virtual reference object for identifying validity. Various embodiments of the present disclosure can provide a guide for validity of the character recognition region. Various embodiments of the present disclosure can improve user's reliability and user's convenience for character recognition.

The electronic device according to various embodiments may be one of various types of electronic devices. The electronic devices may include, for example, at least one of a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar elements. It is to be understood that a singular form of a noun may include one or more of the things, unless the relevant context clearly indicates otherwise. As used herein, each of such phrases as "A or B," "at least one of A and/or B," "A, B, or C," or "at least one of A, B, and/or C" may include all possible combinations of the items enumerated together. As used herein, such terms as "1st," "2nd," "first" or "second" may modify corresponding components regardless of an importance or an order, be used to distinguish a component from another, and does not limit the corresponding components. It is to be understood that if an element (e.g., a first element) is referred to, "(operatively or communicatively) connected with," or "connected to" another element (e.g., a second element), it means that the element may be coupled with the other element directly, or via other element (e.g., a third element).

As used herein, the term "module" includes a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including instructions that are stored in a machine readable storage medium (e.g., internal memory 136 or external memory 138) that is readable by a machine (e.g., computer). The machine may invoke instructions stored in the storage medium, be operated to perform functions according to the instructions invoked, and include the electronic device (e.g., the electronic device 101, the electronic device 200) according to embodiments disclosed. If the instructions are executed by a processor (e.g., the processor 120, the processor 210), the processor may execute functions corresponding to the instructions directly or using other components under the control of the processor. The instructions may include a code generated or executed by a compiler or an interpreter. The machine-readable storage medium may be provided in the form of a non-transitory storage medium. Wherein, the term "non-transitory" simply means that the storage medium does not include a signal and is tangible, but does not differentiate between semi-permanently storing the data in the storage medium and temporarily storing the data in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the storage medium, such as memory of the manufacturer's server, a server of the application store, or a relay server.

According to various embodiments, each component (e.g., a module or a program) may include a single entity or multiple entities, and part of the above-described components may be omitted, or other components may be added. Alternatively or additionally, the part of components (e.g., modules or programs) may be integrated into a single component, and may still perform a function of each component in the same or similar manner as they are performed by each component before the integration. According to various embodiments, operations performed by the module, the program, or another component may be carried out sequentially, in parallel, repeatedly, or heuristically, or at least part operation may be executed in a different order or omitted, or other operations may be added.

What is claimed is:
1. An electronic device comprising:
a housing;
a touchscreen display viewable through a first portion of the housing;
an image sensor exposed through a second portion of the housing;
a wireless communication circuit located in the housing;
a processor operatively coupled to the touchscreen display, the image sensor, and the wireless communication circuit; and
a memory operatively coupled to the processor,
wherein the memory stores instructions, which when executed, cause the processor to control the electronic device to:

display a user interface including an image acquired from the image sensor or stored in the memory; and
recognize a region including a text in the image for optical character recognition (OCR) by:
detecting a boundary of the region,
comparing a size of the region with a reference size, and
selecting the region for the OCR based at least in part on the comparison result, wherein the reference size is changed based on at least one of shooting distance information of the image, information of an activated camera among a plurality of cameras, or magnification information.

2. The electronic device of claim 1, wherein the instructions cause the processor to control the electronic device to:
determine whether the size of the region is greater than the reference size;
select the region for the optical character recognition if it is determined that the size of the region is greater than the reference size; and
select the entire image for the optical character recognition if it is determined that the size of the region is less than the reference size.

3. The electronic device of claim 2, wherein the instructions cause the processor to control the electronic device to:
display an animation effect on the touchscreen display while the region is recognized; and
display a rectangle encompassing the region after displaying the animation effect.

4. The electronic device of claim 1, wherein the instructions cause the processor to control the electronic device to perform the comparison by using a rectangular region having the reference size on the touchscreen display.

5. The electronic device of claim 4, wherein the rectangular region having the reference size has a size of a designated ratio with respect to a width size and height size of the image.

6. The electronic device of claim 1, wherein the instructions cause the processor to control the electronic device to provide a feedback regarding whether the recognized region is valid based at least in part on the comparison result.

7. The electronic device of claim 1, wherein the instructions cause the processor to control the electronic device to change the reference size to include at least one segmented region of which a visual importance is greater than or equal to a designated threshold or at least one of segmented regions based on a user input, based on a salient map for generating the segmented region according to the visual importance.

8. The electronic device of claim 1, wherein the instructions cause the processor to control the electronic device to:
identify whether correction is required for the selected region; and
correct the selected region if the correction is required.

9. The electronic device of claim 1,
wherein the image sensor includes a first image sensor and a second image sensor, and
wherein the instructions cause the processor to control the electronic device to:
identify whether a region including a text can be recognized from a different image acquired using the second image sensor if the region is not recognized from the image acquired using the first image sensor;
identify whether the different image is corrected if the region including the text can be recognized from the different image; and
correct the image acquired using the first image based at least in part on correction information of the different image if correction is required for the different image.

10. A character recognition method of an electronic device comprising:
displaying on a display, an image which includes a content region;
extracting a character recognition region from at least one region of the content region;
generating a virtual reference object based on a rule;
comparing the virtual reference object with the character recognition region;
determining that the character recognition region is valid if the character recognition region is larger than the virtual reference object;
determining that the character recognition region is invalid if the character recognition region is smaller than the virtual reference object;
recognizing a character from the character recognition region if the character recognition region is valid; and
recognizing a character from the displayed image if the character recognition is invalid wherein the image includes a region distinct from the character recognition region if the character recognition is invalid.

11. The method of claim 10, wherein the generating of the virtual reference object based on the rule comprises at least one of:
generating the virtual reference object so as to have a size of a designated ratio with respect to a size of the displayed image and to be located at a center of the displayed image;
generating a salient map for a dividable region of the display image according to visual importance, and generating the virtual reference object to include at least one of at least one segmented region of which visual importance is greater than or equal to a designated threshold and at least one of regions based on a user input; or
determining a size of the virtual reference object based on at least one of shooting distance information of the displayed image, information of an activated camera among a plurality of cameras, and magnification information.

12. The method of claim 10, further comprising
providing a feedback regarding whether the character recognition region is valid if the displayed image is a preview image,
wherein the recognizing of the character comprises:
capturing the character recognition region detected from the preview image; and
recognizing a character from the captured character recognition region.

13. The method of claim 10, further comprising:
if the displayed image is a first preview image acquired using a first camera, and if the character recognition region is not detected from the first preview image, extracting a character recognition region from a capture image of a second preview image acquired using at least one different camera;
correcting the character recognition region extracted from the capture image of the second preview image;
correcting the capture image of the first preview image based at least in part on correction information for the character recognition region extracted from the capture image of the second preview image; and recognizing a character from the corrected capture image of the first preview image.

14. An electronic device comprising:
a display;
a memory storing at least one instruction; and
at least one processor operatively coupled to the display and the memory,
wherein the at least one processor is configured to control the electronic device to, based at least in part on the execution of the instruction:
   display on a display, an image which includes a content region;
   extract a character recognition region from at least one region of the content region;
   generate a virtual reference object based on a rule;
   compare the virtual reference object with the character recognition region;
   determine that the character recognition region is valid if the character recognition region is larger than the virtual reference object;
   determine that the character recognition region is invalid if the character recognition region is smaller than the virtual reference object;
   recognize a character from the character recognition region if the character recognition region is valid; and
   recognize a character from the displayed image if the character recognition is invalid, wherein the image includes a region distinct from the character recognition region if the character recognition is invalid.

15. The electronic device of claim 14, wherein the at least one processor is configured to control the electronic device to:
   generate the virtual reference object so as to have a size of a designated ratio with respect to a size of the displayed image and to be located at a center of the displayed image;
   generate a salient map for a dividable region of the display image according to visual importance and generate the virtual reference object to include at least one of at least one segmented region of which visual importance is greater than or equal to a designated threshold and at least one of regions based on a user input; or
   vary a size of the virtual reference object based on at least one of shooting distance information of the displayed image, information of an activated camera among a plurality of cameras, or magnification information.

16. The electronic device of claim 14, wherein the at least one processor is configured to control the electronic device to:
   provide a feedback regarding whether the character recognition region is valid if the displayed image is a preview image;
   capture the character recognition region detected from the preview image, and
   recognize a character from the captured character recognition region.

17. The electronic device of claim 14, wherein the at least one processor is, when the displayed image is a first preview image acquired using a first camera, configured to control the electronic device to:
   if the character recognition region is not detected from the first preview image, extract a character recognition region from a capture image of a second preview image acquired using at least one different camera;
   correct the character recognition region extracted from the capture image of the second preview image;
   correct the capture image of the first preview image based at least in part on correction information for the character recognition region extracted from the capture image of the second preview image; and
   recognize a character from the corrected capture image of the first preview image.

* * * * *